United States Patent
Inaba et al.

[11] Patent Number: 6,141,514
[45] Date of Patent: Oct. 31, 2000

[54] COMPONENT REUSING SYSTEM, PRODUCT CAPABLE OF BEING EASILY DISASSEMBLED, AND DISASSEMBLING METHOD

[75] Inventors: Ryohei Inaba, Kawasaki; Tomomasa Nakano, Yokohama; Atsuo Tsunoda, Tokyo, all of Japan

[73] Assignee: Canon Kabushiki Kaisha, Tokyo, Japan

[21] Appl. No.: 09/217,934

[22] Filed: Dec. 22, 1998

[30] Foreign Application Priority Data

Dec. 22, 1997 [JP] Japan .................................. 9-353892
Nov. 20, 1998 [JP] Japan ................................. 10-319424

[51] Int. Cl.⁷ .................................................. G03G 15/00
[52] U.S. Cl. ........................................ 399/109; 29/426.4
[58] Field of Search ................................. 399/109, 111; 29/402.03, 402.04, 413, 414, 417, 426.1, 426.4, 426.5, 426.6, 564.3, 895.1, 895.2; 264/157; 347/108, 152, 263

[56] References Cited

U.S. PATENT DOCUMENTS

| | | | |
|---|---|---|---|
| 4,785,655 | 11/1988 | Pistritto et al. | 72/326 |
| 5,577,312 | 11/1996 | Seto | 29/418 |
| 5,676,794 | 10/1997 | Baley | 156/584 |
| 5,729,795 | 3/1998 | Kavolius et al. | 399/109 |

FOREIGN PATENT DOCUMENTS

| | | |
|---|---|---|
| 6-159330 | 6/1994 | Japan . |
| 6-246256 | 9/1994 | Japan . |
| 7-24437 | 1/1995 | Japan . |
| 7-077920 | 3/1995 | Japan . |
| 7-71425 | 3/1995 | Japan . |
| 7-091131 | 4/1995 | Japan . |
| 7-092885 | 4/1995 | Japan . |

*Primary Examiner*—Robert Beatty
*Attorney, Agent, or Firm*—Fitzpatrick, Cella, Harper & Scinto

[57] ABSTRACT

A product, such as a process cartridge, is provided with a plurality of functional units that can be easily disassembled so as to be recycled. The product is constructed to have an equipment body having an attachment member in which to hold the functional units. A joint section portion of the attachment member has a through-slit provided which can be broken off and thereby facilitate removal of the respective functional units.

27 Claims, 23 Drawing Sheets

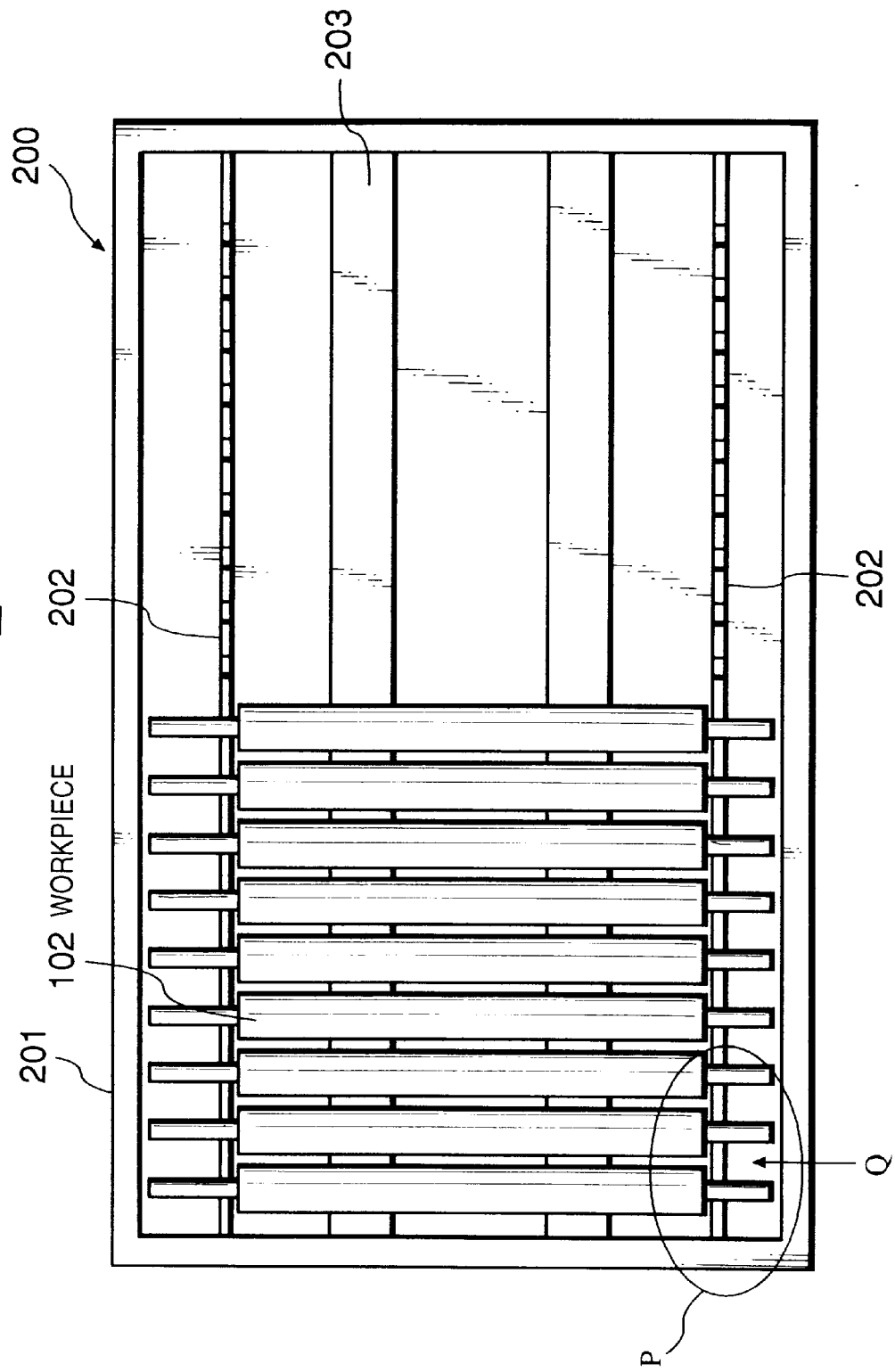

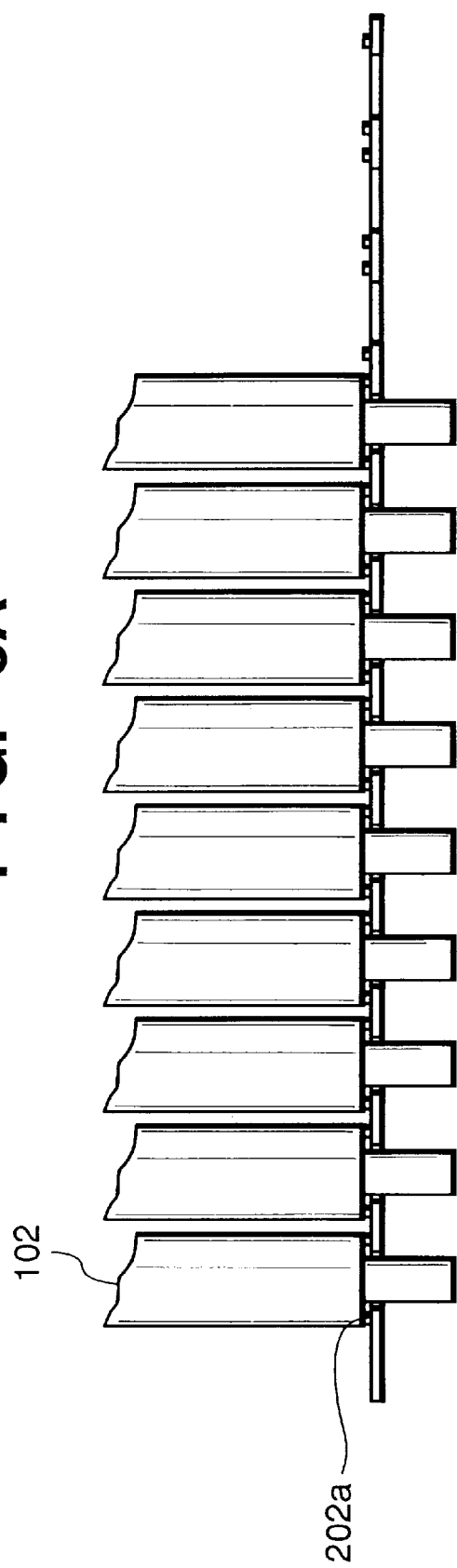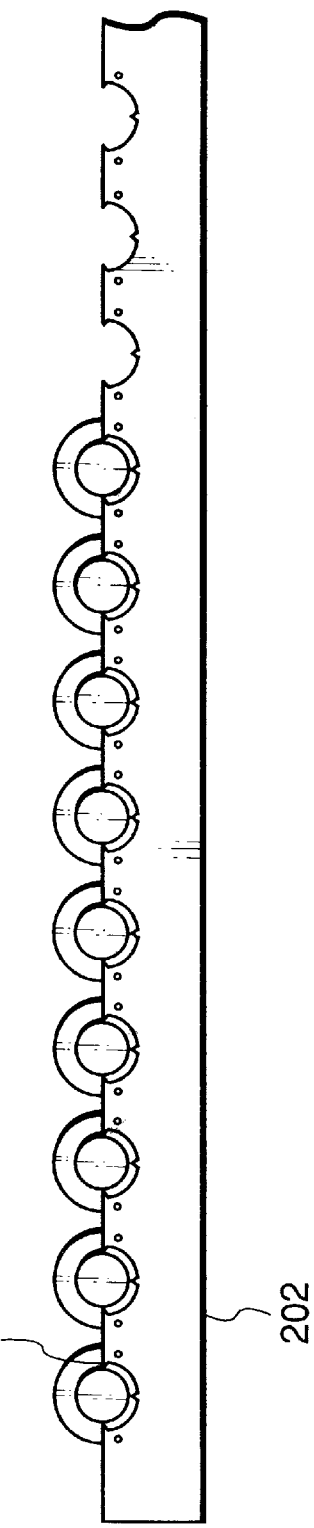

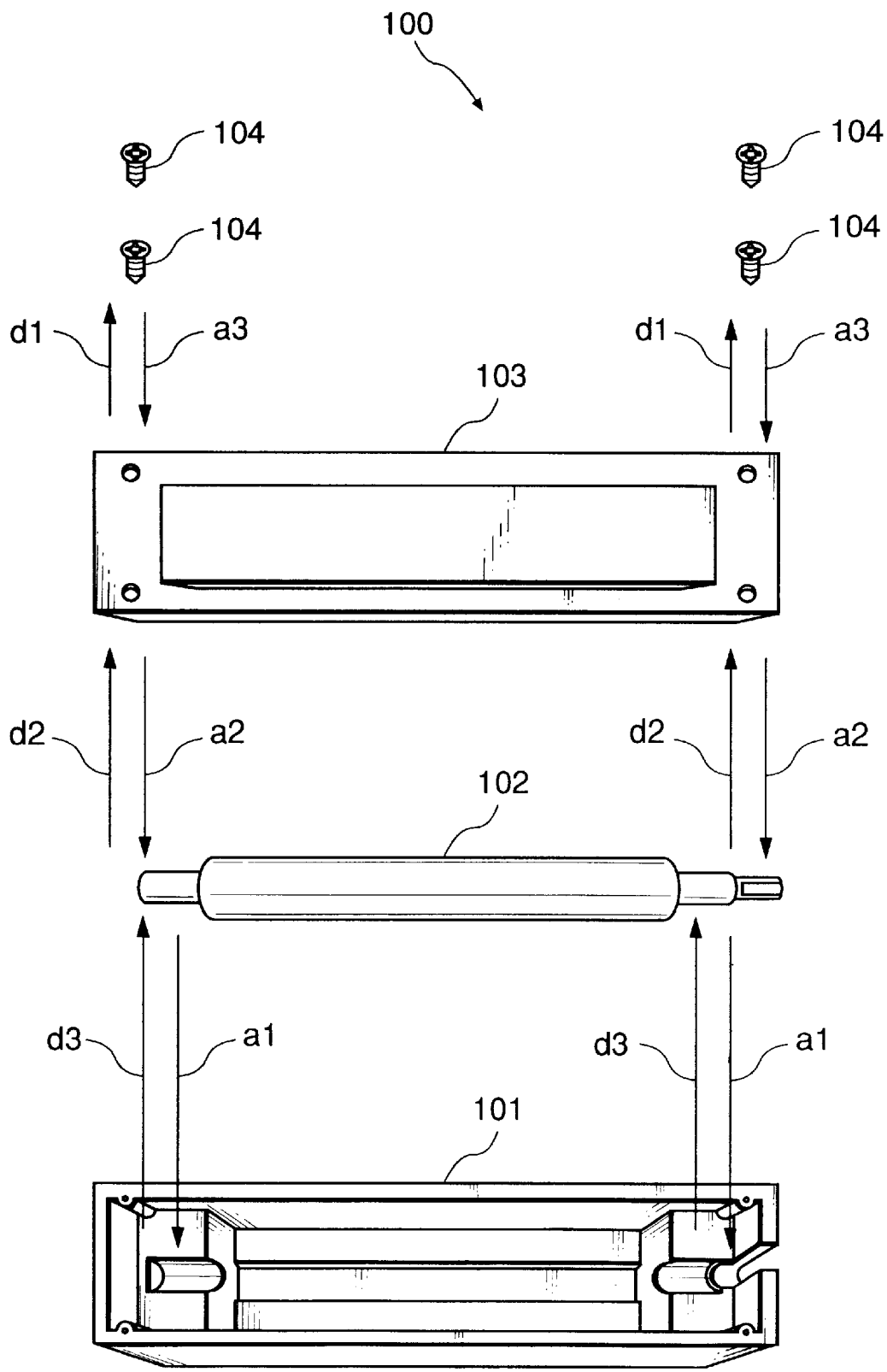
F I G. 6

F I G. 15
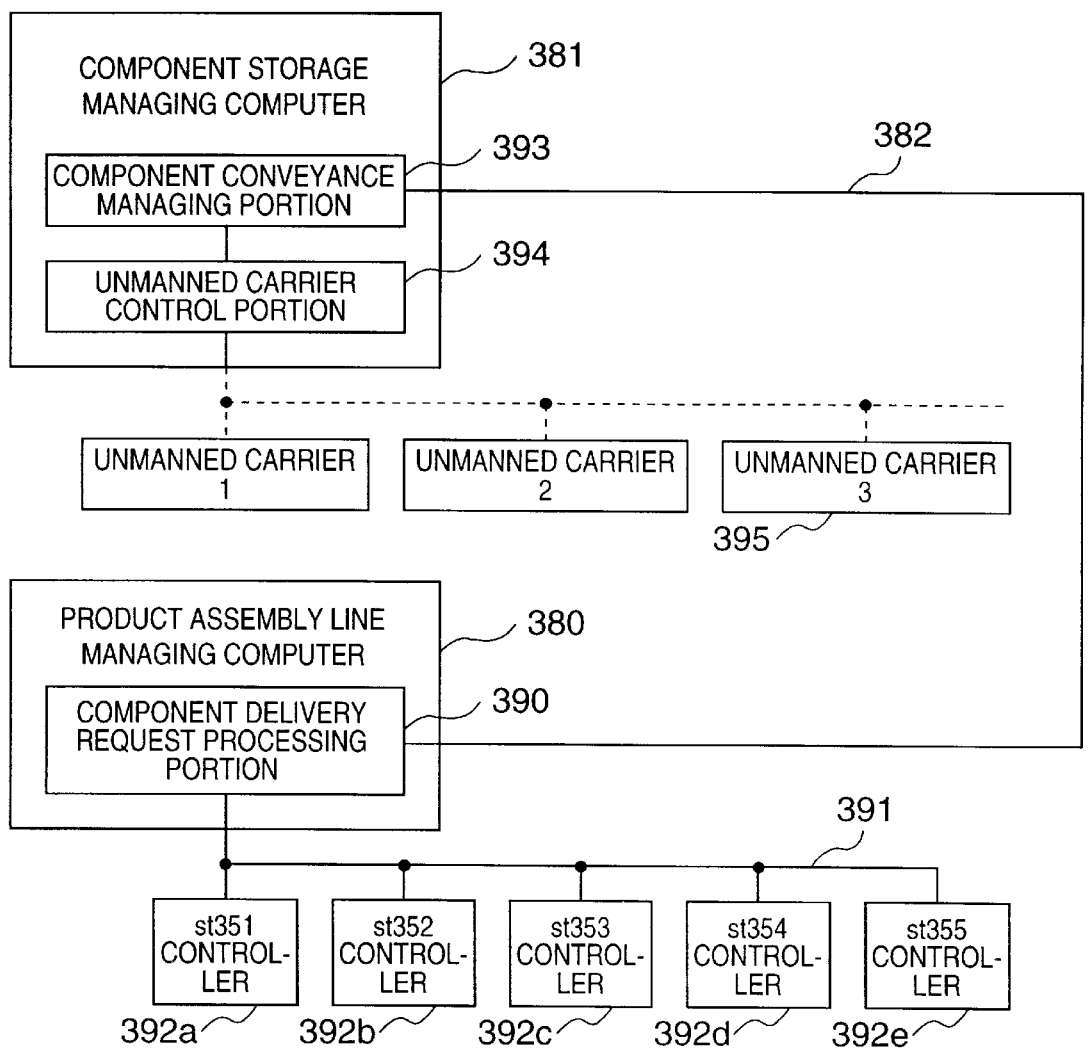

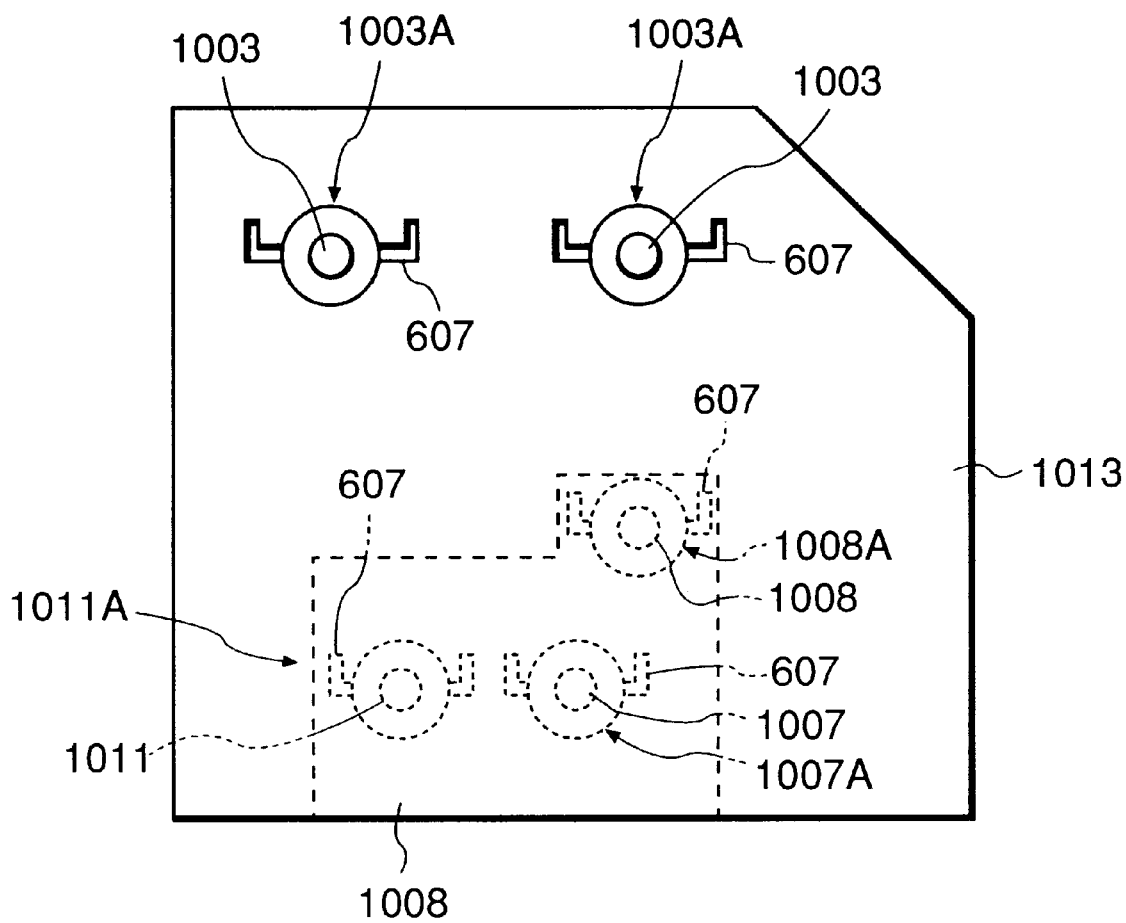
F I G. 26

COMPONENT REUSING SYSTEM, PRODUCT CAPABLE OF BEING EASILY DISASSEMBLED, AND DISASSEMBLING METHOD

BACKGROUND OF THE INVENTION

1. Field of the Invention

The present invention relates to a component reusing system for disassembling a product by a robot or the like into components, and utilizing the disassembled components again as components of new products, a product capable of being easily disassembled, and a disassembling method.

2. Description of the Related Art

Hitherto, it has been customary to disassemble products manually. More specifically, products have been manually disassembled in most steps except that a dedicated machine or tool is employed in the case of requiring large forces to disassemble the product, as experienced when disassembling, for example, a portion assembled tight by caulking. In other words, the concept of disassembling products into single-level components and reusing them has not yet been fixed in industries. Disassembly of products has been restricted to the case where a taken-out portion can still serve as a resusable unit component (i.e., a product), such as an automobile tire and battery, and it has been few to dissemble products for the purpose of obtaining components (i.e., single-level components) used again to construct a new product. Even when disassembling products into single-level components, the disassembling step has been made as a step necessary for taking out the above-mentioned reusable unit component, or implemented for restoration into materials to utilize a value of the component material itself. Therefore, disassembly of products has been restricted to obtain the selected components or unit components, and other components have been sent to a shredding step for each of products or after rough disassembly of each product. The shredded components are reused as material resources, but those ones which are hard to be reused as material resources are employed as shredder dust for, e.g., filling-up.

In order to disassemble used products and take out components with the view of reusing the components in new products, careful disassembly is required to keep the components undamaged so that quality of the taken-out components is surely comparable to that of new components, and a large amount of cost is also required for, e.g., cleaning and inspection of the taken-out components. In addition, with a recent shortening of the product life cycle, opportunities of allowing the taken-out components to be reused is very few.

Because of the background stated above, disassembly of products with intent to reuse disassembled components in new products, and automation of disassembling steps have not been realized for years for the reason of difficulty in success on a commercial basis. Many methods for disassembling products with intent to utilize disassembled components again as material resources are disclosed in, e.g., Japanese Unexamined Patent Publication No. 7-24437 and No. 6-246256.

For expendable supplies used in office automating machines such as spent toner cartridges, for example, it is conceivable, after toner contained as an expendable in the cartridge has been exhausted, to use their housings and process components again in new products instead of shredding them as mentioned above. This is also desired from the standpoint of protecting the global environment.

Those expendable supplies used in office automating machines have a relatively long product life cycle. A remarkable effect upon protection of resources is expected if a system enabling makers to recover spent commodities through the market and recycle them as new products is established.

With increasing attention focused on environmental problems, as mentioned above, development of technology for recycling (reusing) discarded products has been progressed in recent years. However, a main current tendency resides in crushing products directly, sorting out the crushed products, and reuse them as materials or fuel.

That recycling method is disadvantageous from the standpoint of not only cost but also energy consumption because even those components which can be reused in new products are crushed together. Further, because various kinds of materials are mixed, 100% pure materials cannot be obtained after being sorted out, and the restored materials are poor in quality.

The above problem could be overcome by disassembling products individually, utilizing those components again which are reusable as they are, and disassembling those components, which are reused as materials, to single-level members, followed by crushing them.

Conventional products are designed to have such a structure as meeting demands for easier assembly, lower cost, smaller size, lighter weight, etc. For disassembly, however, conventional products are designed to have such a structure that those components, which are required to be disassembled later in view of maintenance, repair, etc., are detachably fixed using screws.

To solve the problems stated above, several methods have been proposed in the past. For example, Japanese Unexamined Patent Publication No. 6-159330 discloses a method of using an elastic member to construct a component for a joint portion, and Japanese Unexamined Patent Publication No. 7-71425 discloses a method of using a shape memory member, as an engaging member, for easier disassembly.

Even for the products which have a conventional Mscrewing structure to be capable of being disassembled, however, a large amount of cost is required to actually disassemble the products, and disassembling the products for the purpose of recycling has difficulty in succeeding on a business basis.

Also, the above two methods disclosed in Japanese Unexamined Patent Publications have drawbacks in points of cost, accuracy and easiness in manufacture, and hence are not yet put into practice for the purpose of recycling.

SUMMARY OF THE INVENTION

The present invention has been accomplished in view of the problems set forth above, and an object of the present invention is to provide a product having a structure suitable for recycling, and a disassembling method.

To solve the above problems and to achieve the above object, a product capable of being easily disassembled, according to a first aspect, is constructed as follows.

In a product comprising a plurality of members, the product is constructed to have a structure with which the members are easily disassembled by breaking off a portion of predetermined one or more of the members.

Also, a product capable of being easily disassembled, according to a second aspect, is constructed as follows.

A functional component or an functional unit is attached to a member fixed to a equipment body, and the member includes a worked portion for facilitating removal of the functional component or the functional unit.

Furthermore, a product capable of being easily disassembled, according to a third aspect, is constructed as follows.

A functional component or a functional unit including a rotatable body is attached to an attachment member fixed to an equipment body, an opening is formed in the attachment member for attaching the rotatable body therein, and a slit is formed to extend from the opening.

A disassembling method according to the present invention is constructed as follows.

In a disassembling method for taking out, from equipment including a functional component or a functional unit, the functional component or the functional unit, a slit is formed in an attachment member to which the functional component or the functional unit is attached, and when taking out the functional component or the functional unit, the attachment member is cut to bridge between both end portions of the slit, allowing the functional component or the functional unit to be removed from an equipment body.

In addition, a product capable of being easily disassembled, according to a fourth aspect, is constructed as follows.

A functional unit including a rotatable body is attached to an attachment member, a rotating member is supported to the attachment member on the side opposite to the rotatable body, a slit is formed in a portion where the rotating member is supported by the attachment member, and the functional unit is removed by cutting the attachment member along a cut line interconnecting both end portions of the slit.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is a schematic view showing a structure of a cleaning tray magazine.

FIGS. 3A and 3B are partial views each showing the structure of the cleaning tray magazine.

FIG. 6 is a view showing an example of products to be handled by the system of the first embodiment.

FIG. 15 is a block diagram showing a configuration to manage and control the operation of the entire system.

FIG. 26 is a side view of FIG. 25.

DESCRIPTION OF THE PREFERRED EMBODIMENTS

Preferred embodiments of the present invention will be described below in detail with reference to the accompanying drawings.

(First Embodiment)

Figure 1:
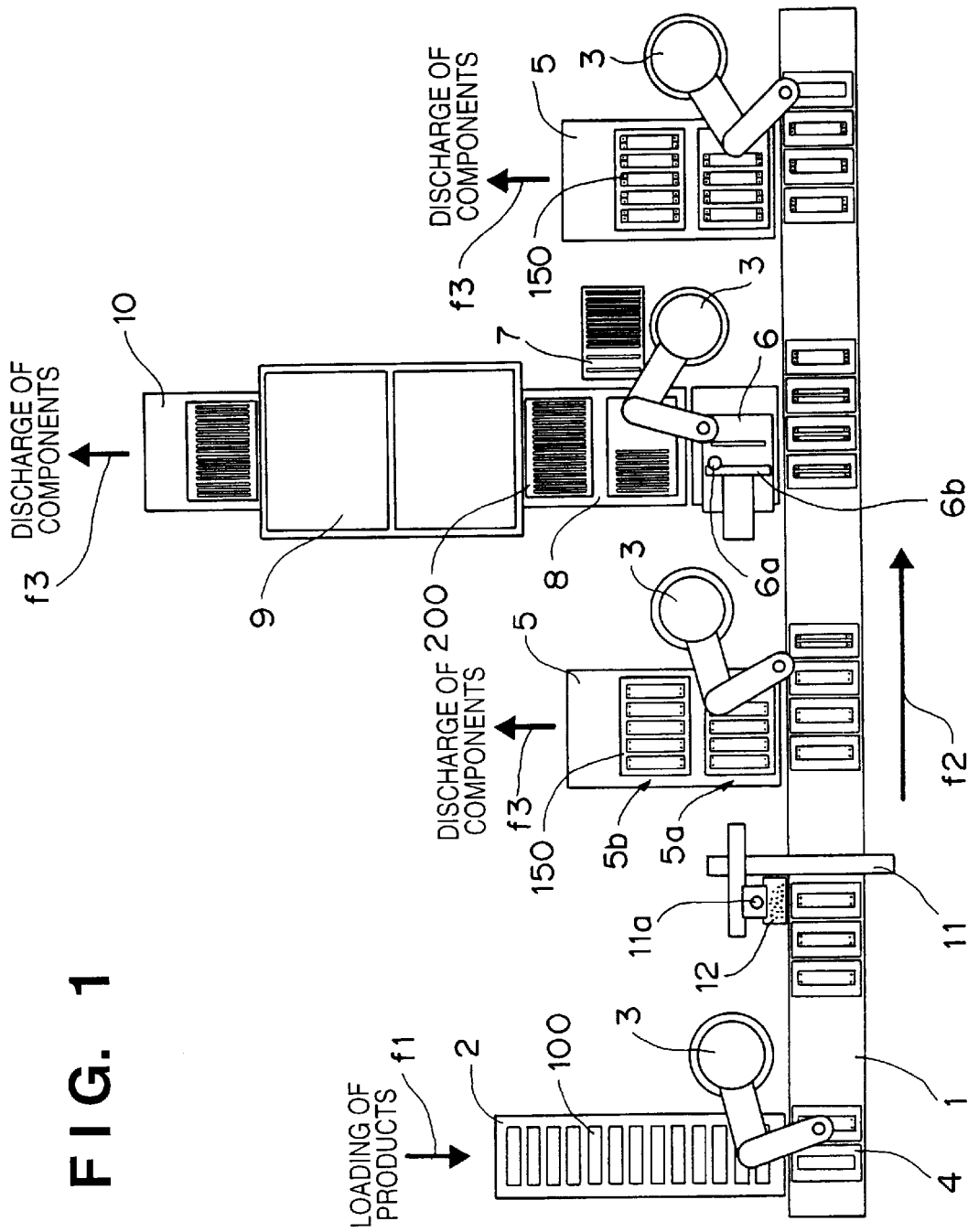
FIG. 1 is a schematic view showing a construction of a product disassembling apparatus according to a first embodiment of the present invention.

FIG. 1 is a schematic view showing a construction of a product disassembling apparatus according to a first embodiment of the present invention.

In FIG. 1, reference numeral 1 denotes a disassembly carrying conveyor, 2 denotes a spent product loading conveyor, and 3 denotes a robot for loading a spent product and taking out components from the product. Reference numeral 4 denotes a product carrying palette which is carried on the disassembly carrying conveyor 1 through a series of work stations. In a robot working area of each work station, the product carrying palette 4 is positioned and fixed in place by a positioning unit (not shown).

Reference numeral 5 denotes a component discharge stocker comprising a robot access portion 5a and a tray magazine stock portion 5b. The tray magazine stock portion 5b can contain a plurality of tray magazines in a heaped state. The component discharge stocker 5 is equivalent to a parts supply stocker used in general automatic assembly. In addition to the robot access portion 5a and the tray magazine stock portion 5b, the component discharge stocker 5 further comprises a mechanism for exchanging the tray magazine between the robot access portion 5a and the tray magazine stock portion 5b, a tray magazine stock portion elevating mechanism for separating the tray magazines in a heaped state one by one and conversely collecting the tray magazines into a heaped state, a tray magazine external interface for transferring the tray magazines in a heaped state to the exterior, and so on. Such a detailed structure is not shown in the drawing.

Reference numeral 6 denotes a component inspecting device for inspecting a taken-out component, and 6a denotes an inspecting head which comprises an optical reading unit in this embodiment. The inspecting head 6a is scanned by an inspecting head moving mechanism 6b to carry out surface inspection of the component to be inspected. Reference numeral 7 denotes a fault component containing portion, 8 denotes a cleaned component loading conveyor, 9 denotes a cleaning apparatus, and 10 denotes a component discharge stocker connected to the cleaning apparatus 9 through a conveyor. Reference numeral 11 denotes a screw removing robot, 11a denotes a screw removing device attached to the screw removing robot 11, and 12 denotes a screw containing box in which removed screws are contained. The screw removing device 11a is constructed so as to unfasten screws by rotating a bit of a conventional automatic screw fastening device backward, and to take out the unfastened screws through a pipe-shaped bit cover while attracting the screws. The screw removing device can be realized with functions equivalent to those of the conventional screw fastening device, and hence it is not described here in more detail.

Reference numeral 150 denotes a tray magazine and 200 denotes a cleaning tray magazine. Each of these tray magazines has component holding portions which are formed in number corresponding to the allowable maximum number of components held therein and are configured in match with the component shape, so that the taken-out components can be contained in the tray magazine in proper positions.

FIGS. 2, 3A and 3B show a typical example of the cleaning tray magazine. In FIG. 2 showing a detailed structure of the cleaning tray magazine, reference numeral 201 denotes an outer frame, 202 denotes a pair of positioning frames, and 203 denotes a pair of reinforcing frames. In an illustrated state, a plurality of workpieces 102 (described later) are contained in the cleaning tray magazine in proper positions. FIG. 3A and 3B show a portion Q in FIG. 2 in more detail. Reference numeral 202a denotes a plurality of projections provided on the positioning frame 202 with intervals in the longitudinal direction of the frame 202 for determining longitudinal positions of the workpieces 102, and 202b denotes a plurality of projections provided on an inner peripheral surface of a shaft holding portion of the positioning frame 202 for determining an axis position of each of the workpieces 102. The projections 202a, 202b are both formed to contact the workpieces 102 at least possible areas.

With the construction described above, the cleaning tray magazine 200 has functions for not only containing the components in proper positions, but also holding the components in such a condition that a detergent is allowed to sufficiently act on any parts of each component to be cleaned. The cleaning tray magazine 200 is made of a material which is endurable against cleaning, such as stainless steel or a toughened plastic.

Figure 4:
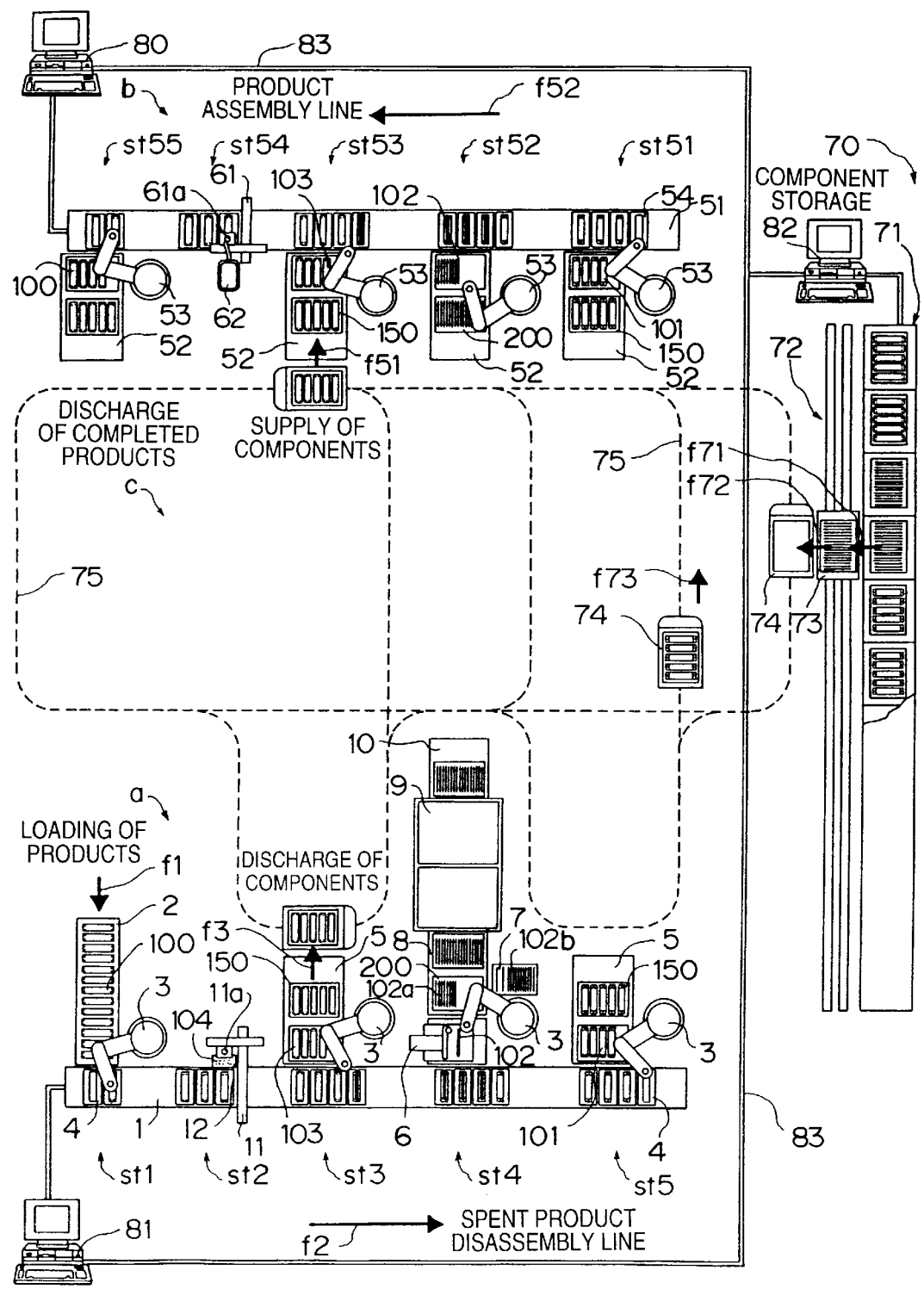
FIG. 4 is a schematic view showing an entire construction of a system according to the first embodiment of the present invention.

FIG. 4 is a schematic view showing an entire construction of a system according to the first embodiment of the present invention.

A line primarily constructed of the disassembly carrying conveyor 1, described above in connection with FIG. 1, is called herein a spent product disassembly line a. A product assembly line b is installed parallel to the spent product disassembly line a. Reference numeral 51 denotes an assembly carrying conveyor, 52 denotes a component supply stocker, 53 denotes an assembling robot, 54 denotes an assembly carrying palette, 61 denotes a screw fastening robot, 61a denotes a screw fastening device attached to the screw fastening robot 61, and 62 denotes a screw supplier for supplying screws to the screw fastening device 61a. Reference numerals 150 and 200 denote a tray magazine and a cleaning tray magazine, respectively, which are the same as those described above in connection with the spent product disassembly line.

A component delivering system c will be described below. Reference numeral 70 denotes a component storage, 71 denotes a component stock shelf, 72 denotes a stacker crane, 73 denotes a magazine tray transfer unit mounted on the stacker crane 72, 74 denotes a plurality of unmanned carriers, and 75 denotes an unmanned carrier running path indicated by broken lines. A layout of the unmanned carrier running path 75 is designed so that the unmanned carriers 74 can run among a station of the spent product disassembly line a which includes the component discharge stocker 5, a station of the product assembly line b which includes the component discharge stocker 52, and the magazine tray transfer unit 73 in the component storage 70.

Figure 5:
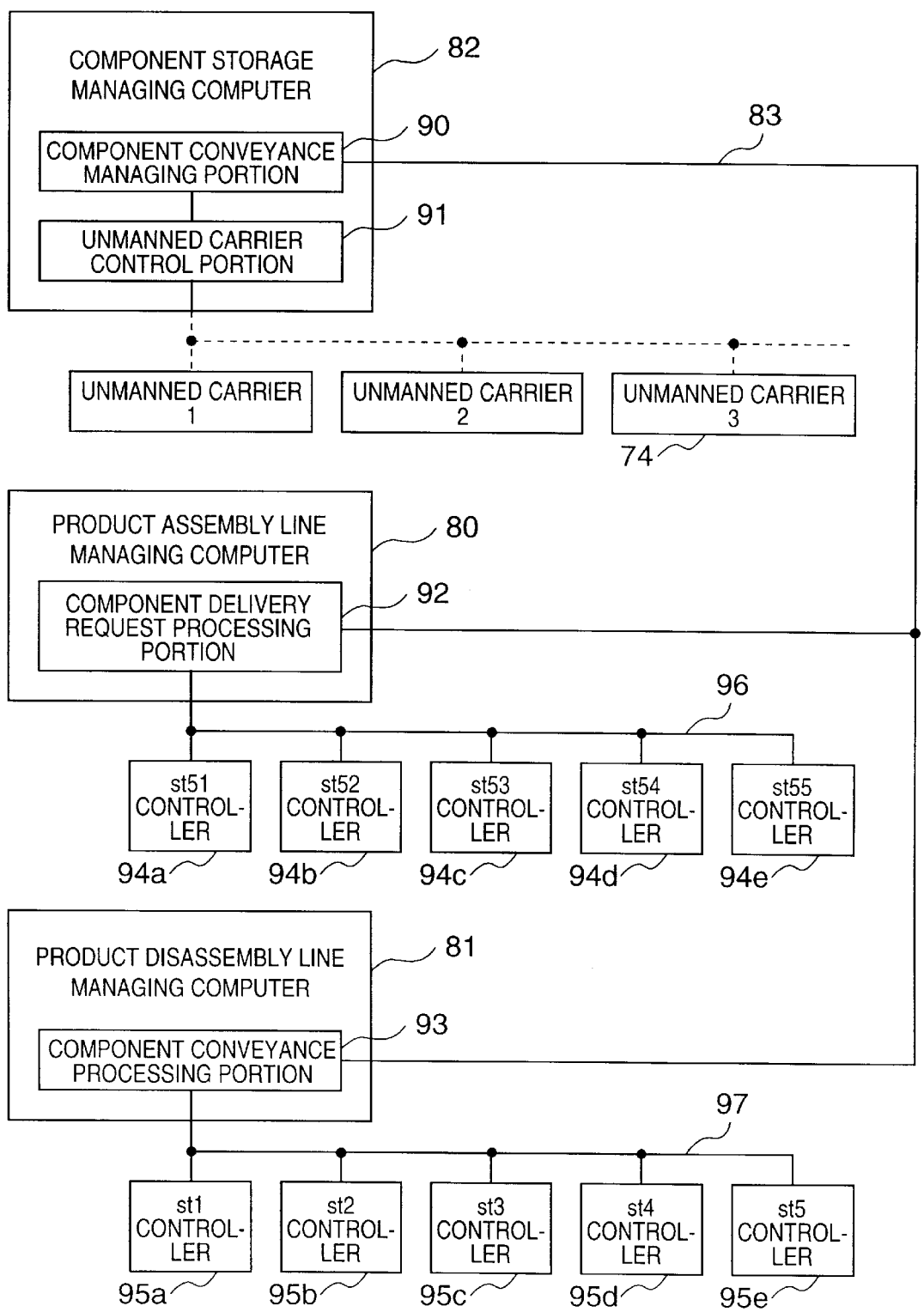
FIG. 5 is a block diagram showing a configuration adapted to manage and control the operation of the entire system.

Next, a configuration adapted to manage and control the operation of the entire system will be described with reference to FIG. 5. Reference numeral 80 denotes a product assembly line managing computer, 81 denotes a product disassembly line managing computer, and 82 denotes a component storage managing computer, these computers being interconnected via a floor LAN 83. As also seen from the schematic view of the entire system shown in FIG. 4 which indicates a system configuration including the positions where the computers are installed, the computers 80, 81 and 82 serve to manage blocks of the product assembly line b, the spent product disassembly line a, and the component delivering system c, respectively.

Describing each block in more detail, reference numeral 92 denotes a component delivery request processing portion which locates in the product assembly line managing computer and is connected via a product assembly line LAN 96 to station controllers 94a–94e each provided in corresponding one of stations of the product assembly line. Likewise, reference numeral 93 denotes a component conveyance processing portion which locates in the product disassembly line managing computer and is connected via a product disassembly line LAN 97 to station controllers 95a–95e each provided in corresponding one of stations of the product disassembly line. Reference numeral 90 denotes a component conveyance managing portion and 91 denotes an unmanned carrier control portion, these portions 90 and 91 being located in the component storage managing computer and being able to communicate with the unmanned carriers 74 through the magazine tray transfer unit 73 in the component storage 70.

Prior to describing the operation of the entire system, an example of products to be handled in the system of the first embodiment will be described with reference to FIG. 6.

A product 100 to be handled in the system comprises a housing 101, a roller component 102 inserted in and rotatably supported by the housing 101, and a housing cover 103 which partly serves to rotatably support the roller component 102. Four screws 104 are used to fix the housing cover 103 to the housing 101 by screwing.

Figure 7:
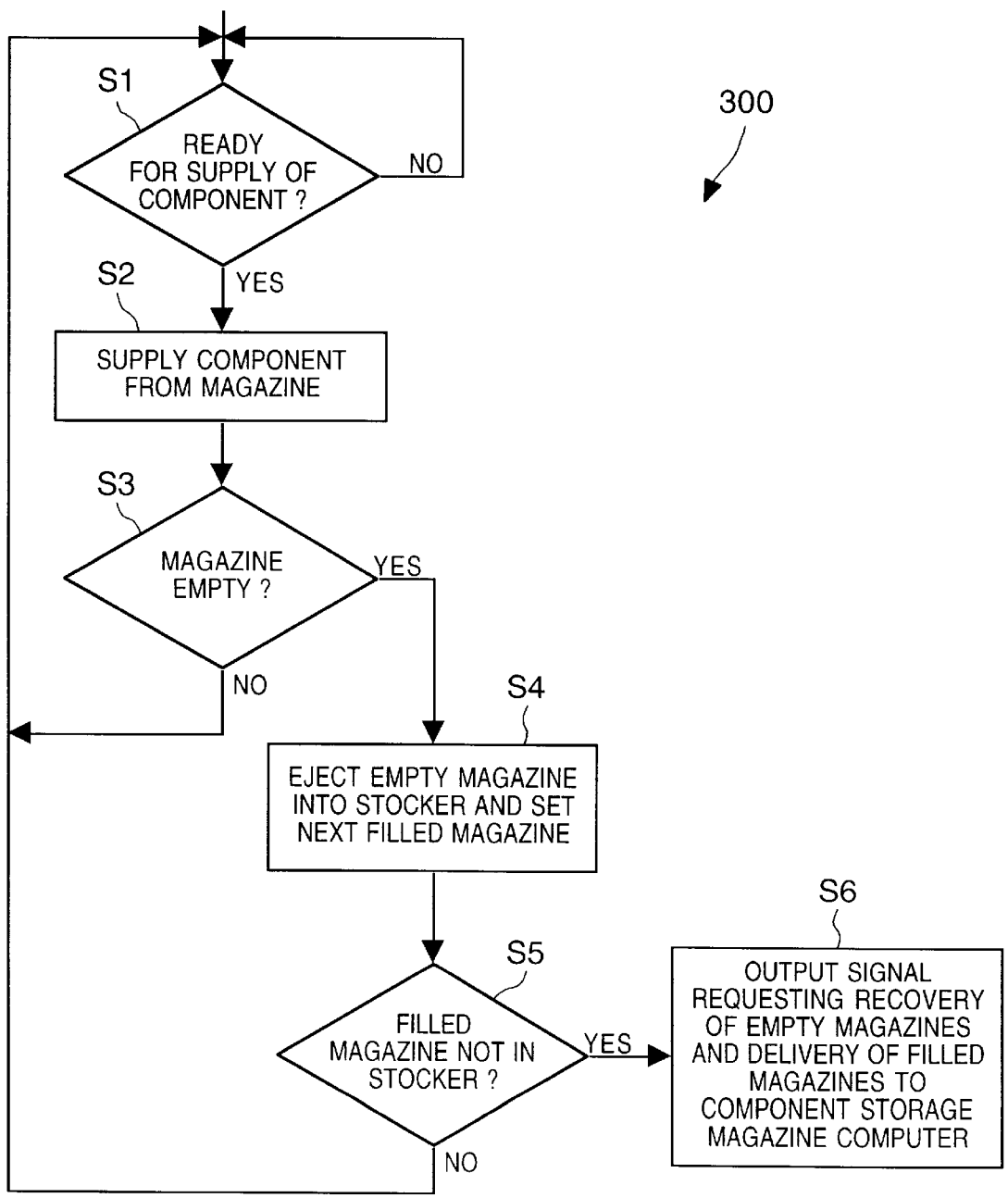
FIG. 7 is a flowchart showing the magazine monitoring operation of a product assembly line managing computer.
Figure 8:
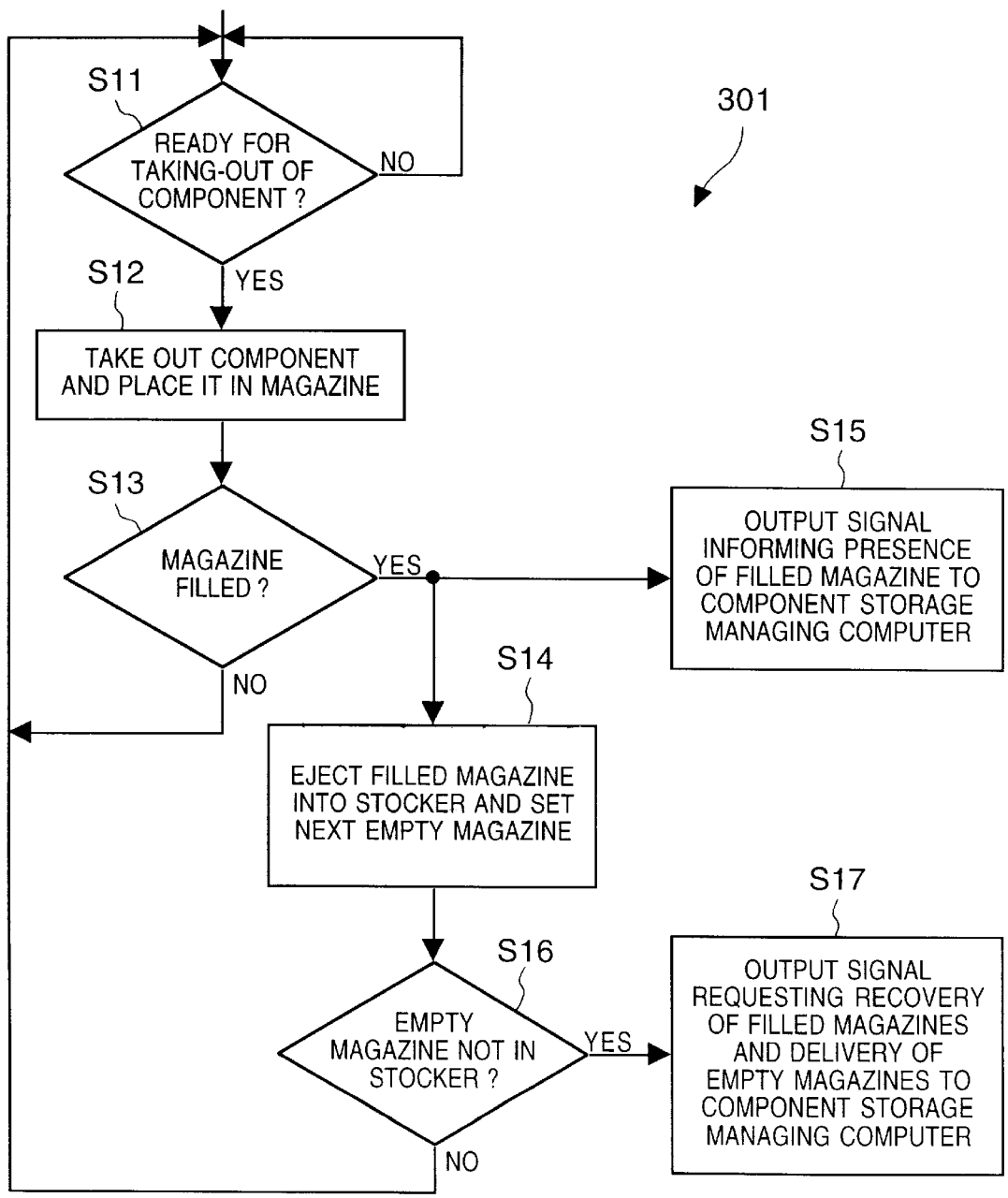
FIG. 8 is a flowchart showing the magazine monitoring operation of a product disassembly line managing computer.
Figure 9:
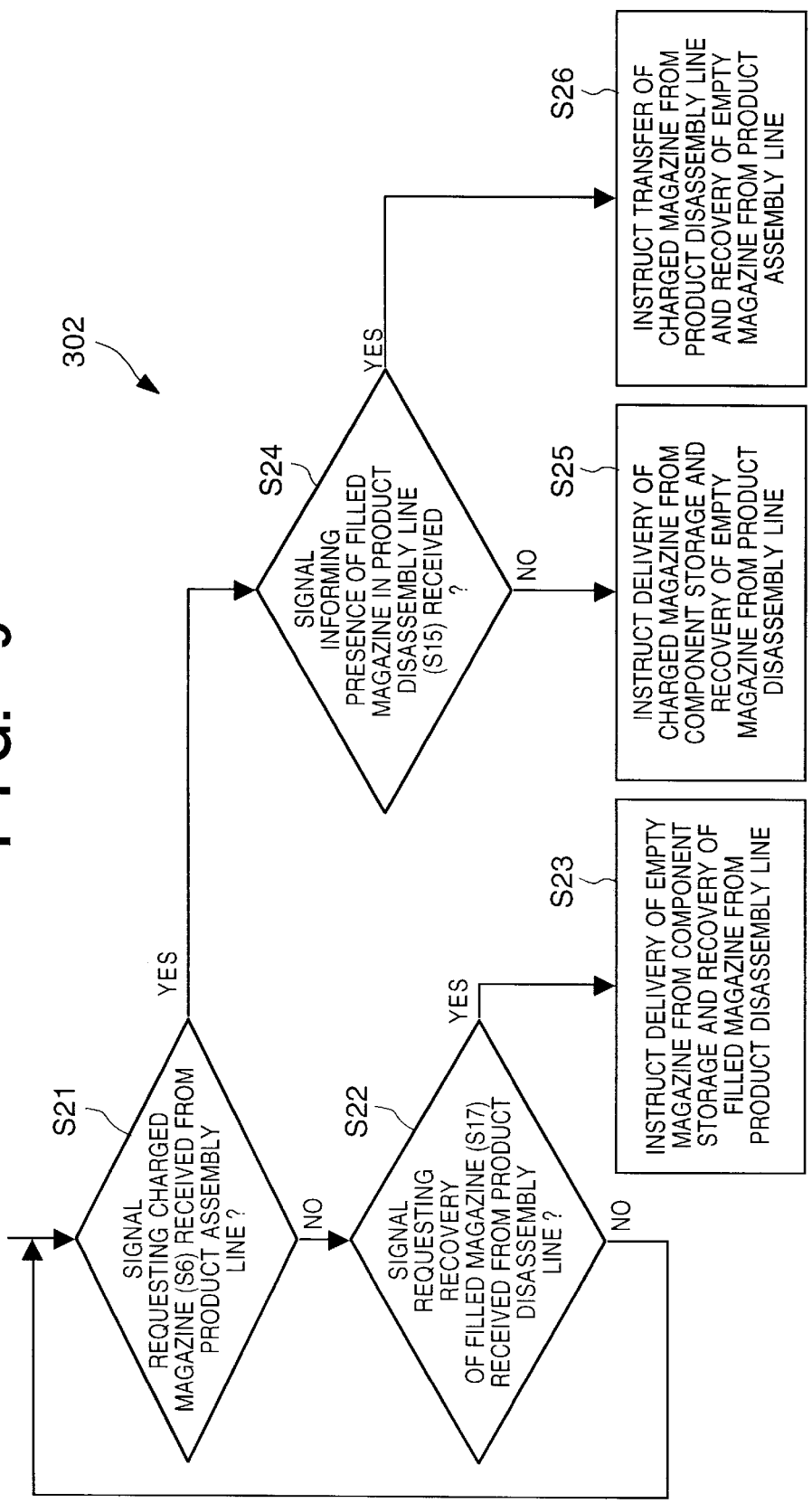
FIG. 9 is a flowchart showing the unmanned carrier control operation of a component storage managing computer.

The operation of processes for spent product disassembling work and product assembling work according to the first embodiment will now be described with reference to FIG. 4 showing the entire system and FIGS. 7 to 9 showing flowcharts of the operation.

The operation of the spent product disassembly line a will be first described.

In a first station st1, the products 100 to be disassembled are loaded onto the spent product loading conveyor 2 as indicated by a product loading flow f1. The loaded products 100 are picked up by the robot 3 one by one and are placed in the product carrying palette 4 which is positioned on the disassembly carrying conveyor 1 in a point corresponding to the first station st1. Then, the product carrying palette 4 is conveyed in a direction indicated by a flow f2 until reaching a second station st2. Upon reaching the second station st2, the product carrying palette 4 is positioned by positioning means (not shown) in a point corresponding to the second station st2 (while such steps of conveying and positioning the product carrying palette 4 are performed in the succeeding process as well, a description of those steps will not be repeated because those steps are performed in the same manner as described above).

In the second station st2, the screw removing robot 11 removes the four screws 104 by using the screw removing device 11a, and then put the removed screws in the screw containing box 12.

In a third station st3, the robot 3 removes the housing cover 103 and places the removed housing cover 103 in a vacant space of the tray magazine 150 while properly positioning it, the tray magazine 150 being positioned on the component discharge stocker 5.

In a fourth station st4, the robot 3 removes the roller component 102 and places the removed roller component 102 in a component positioning portion of the component inspecting device 6. The above-described component inspection is performed here by the component inspecting device 6. If a result of the inspection is acceptable, the robot 3 places a picked-up good roller component 102a in a vacant space of the cleaning tray magazine 200 while properly positioning it, the cleaning tray magazine 200 being positioned on the cleaned component loading conveyor 8 which serves as a good component containing portion. On the other hand, if a result of the inspection is not acceptable, the robot 3 places a picked-up fault roller component 102b in a fault component containing portion 7. When the cleaning tray magazine 200 is filled with the good roller components 102a, the cleaned component loading conveyor 8 is actuated to move the cleaning tray magazine 200 into the cleaning apparatus 9.

In a fifth station st5, the robot 3 picks up the housing 101 from the product carrying palette 4 and places the picked-up housing 101 in a vacant space of the tray magazine 150 while properly positioning it, the tray magazine 150 being positioned on the component discharge stocker 5.

The operation of the product assembly line b will be next described.

In a first station st51, the assembling robot 53 picks up one housing 101 from the tray magazine 150 which is positioned on the component supply stocker 52, and places the picked-up housing 101 on the assembly carrying palette 54 which is positioned on the assembly carrying conveyor 51. Then, the assembly carrying palette 54 is conveyed in a direction indicated by a flow f52 until reaching a second station st52. Upon reaching the second station st2, the assembly carrying palette 54 is positioned by positioning means (not shown) in a point corresponding to the second station st52 (while such steps of conveying and positioning the assembly carrying palette 54 are performed in the succeeding process as well, a description of those steps will not be repeated because those steps are performed in the same manner as described above).

In the second station st52, the assembling robot 53 picks up one roller component 102 from the cleaning tray magazine 200 which is positioned on the component supply stocker 52, and assembles the picked-up roller component 102 to the housing 101 on the assembly carrying palette 54 which is positioned on the assembly carrying conveyor 51.

In a third station st53, the assembling robot 53 picks up one housing cover 103 from the tray magazine 150 which is positioned on the component supply stocker 52, and assembles the picked-up housing cover 103 to the housing 101 on the assembly carrying palette 54 which is positioned on the assembly carrying conveyor 51.

In a fourth station st54, the screw fastening robot 61 fastens four screws 104, which are supplied from the screw supplier 62, to the housing 101 on the assembly carrying palette 54 which is positioned on the assembly carrying conveyor 51, thereby fixing the housing cover 103 and the housing 101 together.

In a fifth station st55, the assembling robot 53 picks up the assembled housing 101 from the assembly carrying palette 54 which is positioned on the assembly carrying conveyor 51, and places the picked-up housing 101 in the tray magazine 150 while properly positioning it, the tray magazine 150 being positioned on the component supply stocker 52. At this time, the component supply stocker 52 serves as a component discharge stocker.

The operation of the component delivering line c will be next described.

The flowchart of FIG. 7 shows a magazine monitoring flow 300 executed by the product assembly line managing computer.

The flow process is executed through communication between the station controllers 94 in the respective stations of the product assembly line and the component delivery request processing portion 92 in the product assembly line managing computer 80. The following steps S1 to S5 are executed in the station controllers 94, while the following step S6 is executed in the component delivery request processing portion 92.

In the step S1, whether the assembly carrying palette 54 is positioned in a prescribed position on the assembly carrying conveyor 51 is determined in response to a signal from a positioning unit (not shown). Also, whether the tray magazine 150 is positioned in a prescribed position on the component supply stocker 52 is determined in response to a signal from the component supply stocker 52. If the two signals indicate that the assembly carrying palette 54 and the tray magazine 150 are both completely positioned, it is determined that the line is ready for supply of the component, followed by proceeding to the next step.

In the step S2, the robot 53 picks up one component from the tray magazine 150, namely, receives one supplied component, and assembles the picked-up component to a workpiece on the assembly carrying palette 54.

In the step S3, at the time one component is picked up from the tray magazine 150, it is checked whether any component still remains in the tray magazine for supply. This is determined with the aid of a not-shown unit for counting the number of components supplied. If there still remains a component, the flow returns to the step S1. If it is found that the tray magazine is empty, the flow proceeds to the next step S4.

In the step S4, the component supply stocker 52 is actuated to eject the empty magazine into the stock portion, and to set a next magazine charged with components instead in the robot access portion while properly positioning it.

In the step S5, at the time the charged magazine is newly withdrawn from the magazine stock portion, it is checked whether any charged magazine still remains in the magazine stock portion. This is determined with the aid of a not-shown unit for counting the number of tray magazines ejected. If there still remains a tray magazine, the flow returns to the step S1. If it is found that no charged magazine remains in the magazine stock portion, the station controller 94 outputs a signal to the component delivery request processing portion 92 via communication, following which the flow proceeds to the next step S6.

In the step S6, the component delivery request processing portion 92 outputs a signal requesting recovery of the empty magazine and delivery of a new charged magazine to the component storage managing computer 82 via the floor LAN 83.

The flowchart of FIG. 8 shows a magazine monitoring flow 301 executed by the product disassembly line managing computer.

The flow process is executed through communication between the station controllers 95 in the respective stations of the spent product disassembly line and the component conveyance processing portion 93 in the product disassembly line managing computer 81. The following steps S11 to S14 and S16 are executed in the station controllers 95, while the following step S15 and S17 are executed in the component conveyance processing portion 93.

In the step S11, whether the product carrying palette 4 is positioned in a prescribed position on the disassembly carrying conveyor 1 is determined in response to a signal from a positioning unit (not shown). Also, whether the tray magazine 150 is positioned in a prescribed position on the component discharge stocker 5 is determined in response to a signal from the component discharge stocker 5. If the two signals indicate that the product carrying palette 4 and the tray magazine 150 are both completely positioned, it is determined that the line is ready for taking-out of the component, followed by proceeding to the next step.

In the step S12, the robot 3 takes out a component from a workpiece on the product carrying palette 4, and places the taken-out component in the tray magazine 150 on the component discharge stocker 5.

In the step S13, at the time the component is placed in the tray magazine 150, it is checked whether any component receiving space is still left in the tray magazine for receiving another component. This is determined with the aid of a not-shown unit for counting the number of components received. If there is still left a component receiving space, the flow returns to the step S11. If it is found that the tray magazine is full, the flow proceeds to the next step S14, and simultaneously the station controller 95 outputs a signal to the component conveyance processing portion 93 via communication before proceeding to the step S15.

In the step S14, the component discharge stocker 5 is actuated to eject the filled magazine into the stock portion, and to set an empty magazine instead in the robot access portion while properly positioning it.

In the step S15, the component conveyance processing portion 93 outputs, via the floor LAN 83, a signal informing the component storage managing computer 82 of that there is a filled magazine on the line, along with the component name and the name of the station in which the filled magazine is stocked. Note that, at this time, the signal merely informs the presence of the filled magazine and the place where it locates, and a request for recovery of the filled magazine is not yet issued.

In the step S16, at the time the empty magazine is newly withdrawn from the magazine stock portion as mentioned above, it is checked whether any empty magazine still remains in the magazine stock portion. This is determined with the aid of a not-shown unit for counting the number of tray magazines ejected. If there still remains an empty tray magazine, the flow returns to the step S11. If it is found that no empty magazine remains in the magazine stock portion, the station controller 95 outputs a signal to the component conveyance processing portion 93 via communication, following which the flow proceeds to the next step S17.

In the step S17, the component conveyance processing portion 93 outputs a signal requesting recovery of the filled magazine and delivery of a new empty magazine to the component storage managing computer 82 via the floor LAN 83.

The flowchart of FIG. 9 shows an unmanned carrier control flow 302 executed by the component storage managing computer. The flow process is executed by the component conveyance managing portion 90 in the component storage managing computer 82 in accordance with signals received from the product assembly line managing computer 80 and the product disassembly line managing computer 81.

In a step S21, it is checked whether the signal requesting recovery of the empty magazine and delivery of a new charged magazine, issued in the step S6, is received from the product assembly line. If not received, the flow proceeds to a step S22, and if received, the flow proceeds to a step S24.

In the step S22, it is checked whether the signal requesting recovery of the filled magazine and delivery of a new empty magazine, issued in the step S17, is received from the product disassembly line. If not received, the flow returns to the step S21, and if received, the flow proceeds to a step S23.

In the step S23, the component storage managing computer 82 instructs the stacker crane 72 in the component storage 70 to take out an empty tray magazine from the component stock shelf 71 and then to load the empty tray magazine in the unmanned carrier 74 with the aid of the magazine tray transfer unit 73, and also instructs the unmanned carrier control portion 91 to deliver the empty magazine to the station which outputs the signal requesting recovery of the filled magazine and delivery of a new empty magazine, and then to recover the filled magazine from that station in the return path (as represented by f3 in FIG. 4). The recovered filled magazine is controlled to be contained again in the component storage.

In the step S24, for the component whose delivery was requested in the step S21, it is checked whether the requested component is present as a magazine filled with requested components on the product disassembly line. Specifically, it is checked whether the signal output in the step S15 for informing that there is a filled magazine on the line, along with the component name and the name of the station in which the filled magazine is stocked, is received for the component requested at that time. If the requested component is not present as a magazine filled with requested components on the product disassembly line, the flow proceeds to a next step S25, and if the magazine filled with requested components is present on the product disassembly line, the flow proceeds to a step S26.

In the step S25, for the component whose delivery was requested in the step S21, the component storage managing computer 82 instructs the stacker crane 72 in the component storage 70 to take out a tray magazine, in which the requested components are contained, from the component stock shelf 71 (represented by f71 in FIG. 4) and then to load the taken-out tray magazine in the unmanned carrier 74 (represented by f72 in FIG. 4) with the aid of the magazine tray transfer unit 73, and also instructs the unmanned carrier 74 through the unmanned carrier control portion 91 to deliver the taken-out magazine to the station on the product assembly line, which outputs the signal requesting recovery of the empty magazine and delivery of a new magazine charged with requested components, for supply to the component supply stocker (represented by f51 in FIG. 4), and then to recover the empty magazine from that station in the return path. The recovered empty magazine is controlled to be contained again in the component storage.

In the step S26, for the component whose delivery was requested in the step S21, the component storage managing computer 82 instructs the unmanned carrier 74 through the unmanned carrier control portion 91 to go to the station on the product disassembly line, which issued the signal informing the presence of the requested component on the product disassembly line as a magazine filled with requested components in the above step S15, for receiving the requested component, then to deliver the received requested component to the station on the product assembly line, which outputs the signal requesting recovery of the empty magazine and delivery of a new magazine charged with requested components, and to recover the empty magazine from that station in the return path. The recovered empty magazine is controlled to be contained again in the component storage.

With the operations described above, the spent product disassembly line a implements disassembly of products, and the product assembly line b implements assembly of products. The components automatically picked up by the robot 3 in the spent product disassembly line a are successively placed in the tray magazine 150 side by side. In the product assembly line b, the assembling robot 53 successively picks up components from the tray magazine 150, in which the components are contained side by side, to assemble the products. Furthermore, the components picked up by the robot 3 in the spent product disassembly line a are inspected, if necessary, and then cleaned, if necessary, before being successively placed in the tray magazine 150 or the cleaning tray magazine 200, which functions similarly to the tray magazine 150, side by side. The tray magazine 150 or the cleaning tray magazine 200 is moved with the unmanned carrier 74 in the component delivering system c under control between the component discharge stocker 5 on the spent product disassembly line a and the component storage 70, between the component supply stocker 52 on the product assembly line b and the component storage 70, and between the component discharge stocker 5 on the spent product disassembly line a and the component supply stocker 52 on the product assembly line b (as represented by f73, for example).

(Second Embodiment)

Figure 10:
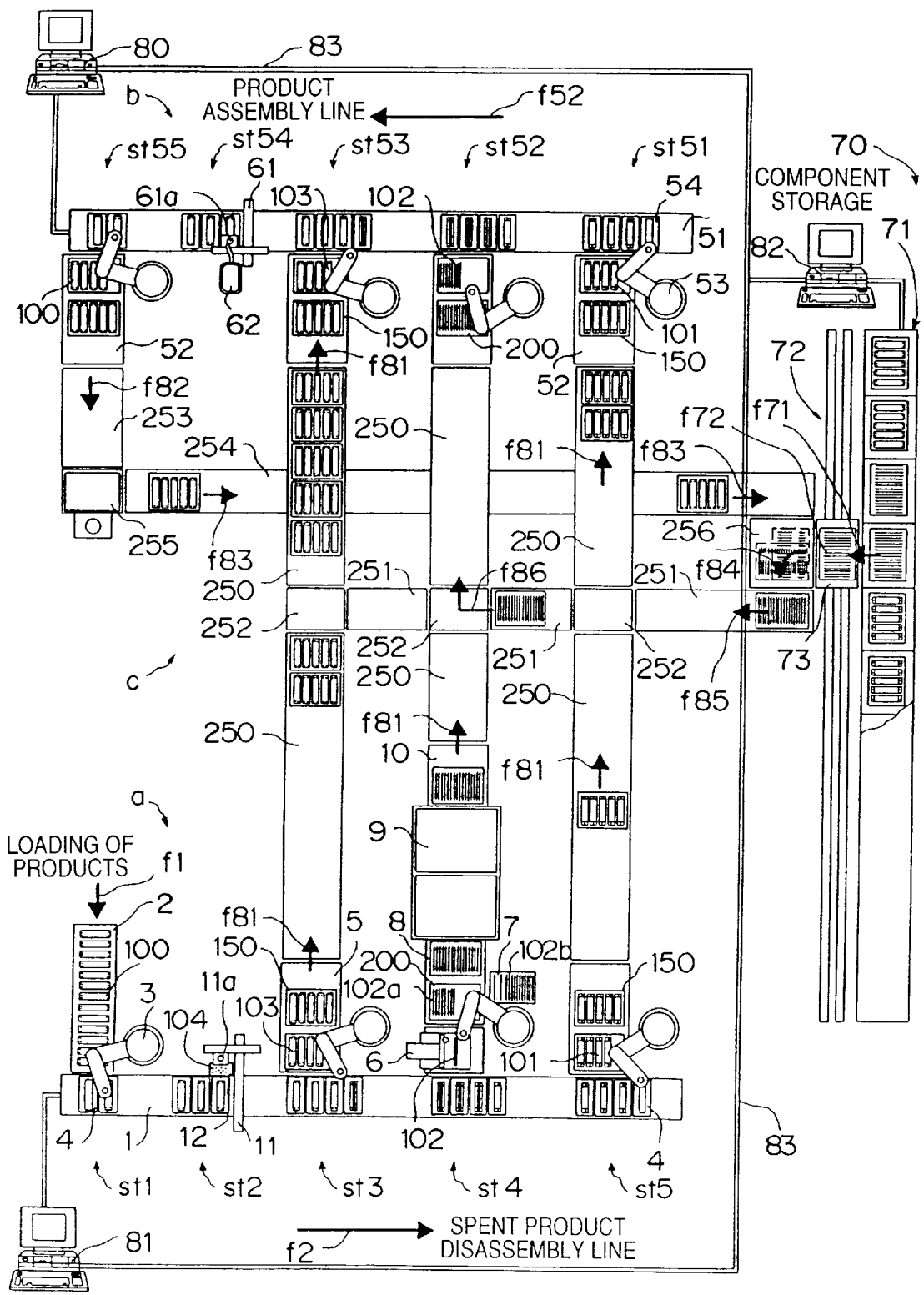
FIG. 10 is a schematic view showing an entire construction of a system according to a second embodiment of the present invention.

A second embodiment as a modification of the above first embodiment is shown in FIG. 10, and will be described below only about differences from the first embodiment.

Reference numeral 250 denotes a longitudinal carrying conveyor interconnecting the component discharge stocker 5 and the component supply stocker 52. The longitudinal carrying conveyor 250 runs in a direction from the component discharge stocker 5 toward the component supply stocker 52 (as indicated by f81) to carry tray magazines. Reference numeral 251 denotes a transverse carrying conveyor interconnecting the component storage 70 and the longitudinal carrying conveyor 250. The transverse carrying conveyor 251 runs in a direction from the component storage 70 toward the idh longitudinal carrying conveyor 250 (as indicated by f85) to carry tray magazines. Reference numeral 252 denotes an intersection between the longitudinal carrying conveyor 250 and the transverse carrying conveyor 251. The intersection 252 has a function for transferring tray magazines conveyed with the transverse carrying conveyor 251 onto the longitudinal carrying conveyor 250. Reference numeral 253 denotes an assembled product discharge conveyor running in a direction, in which products completed in the fifth station st55 of the product assembly line are discharged (as indicated by f82), to carry tray magazines. Reference numeral 254 denotes a discharge transverse conveyor interconnecting the assembled product discharge conveyor 253 and the component storage 70. The discharge transverse conveyor 254 runs in a direction from the assembled product discharge conveyor 253 toward the component storage 70 (as indicated by f83) to carry tray magazines in which the completely assembled products are contained. Additionally, the discharge transverse conveyor 254 runs at such a lower level as crossing the longitudinal carrying conveyor 250 at different levels.

Reference numeral 255 denotes a junction between the assembled product discharge conveyor 253 and the discharge transverse conveyor 254. The junction 255 has a function for elevating tray magazines, and also a function for receiving tray magazines from the assembled product discharge conveyor 253 and transferring them onto the discharge transverse conveyor 254 at a lower level. Reference numeral 256 denotes a tray magazine transfer unit in the component storage 70, which has a function for transferring tray magazines between the component stock shelf 71 and the transverse carrying conveyor 251 or the discharge transverse conveyor 254 while correcting the posture of the tray magazine carried.

A group of the conveyors thus constructed function instead of the unmanned carriers described in connection with the above first embodiment. In the construction of this embodiment, however, the tray magazines discharged from the spent product disassembly line a are directly carried by the longitudinal carrying conveyor 250 to the component supply stocker 52 on the product assembly line b, which employs relevant components, without being carried to the component storage 70. If the number of relevant components discharged from the spent product disassembly line a is deficient in comparison with the number of components requested by the product assembly line b, the operation of carrying the corresponding tray magazine is performed to compensate for the deficiency by supplying the relevant components from the component storage 70. Flows of the tray magazine effecting such an operation are represented, for example, by f84, f85 and f86 in FIG. 10. Specifically, the tray magazine is carried from the component storage 70 to the component supply stocker 52 on the product assembly line b via the transverse carrying conveyor 251, the intersection 252, and the longitudinal carrying conveyor 250.

Comparing with the first embodiment, this second embodiment is advantageous in that tray magazines can be more efficiently at higher speeds when products are manufactured in completely synchronous relation between the spent product disassembly line a and the product assembly line b.

(Third Embodiment)

Figure 11:
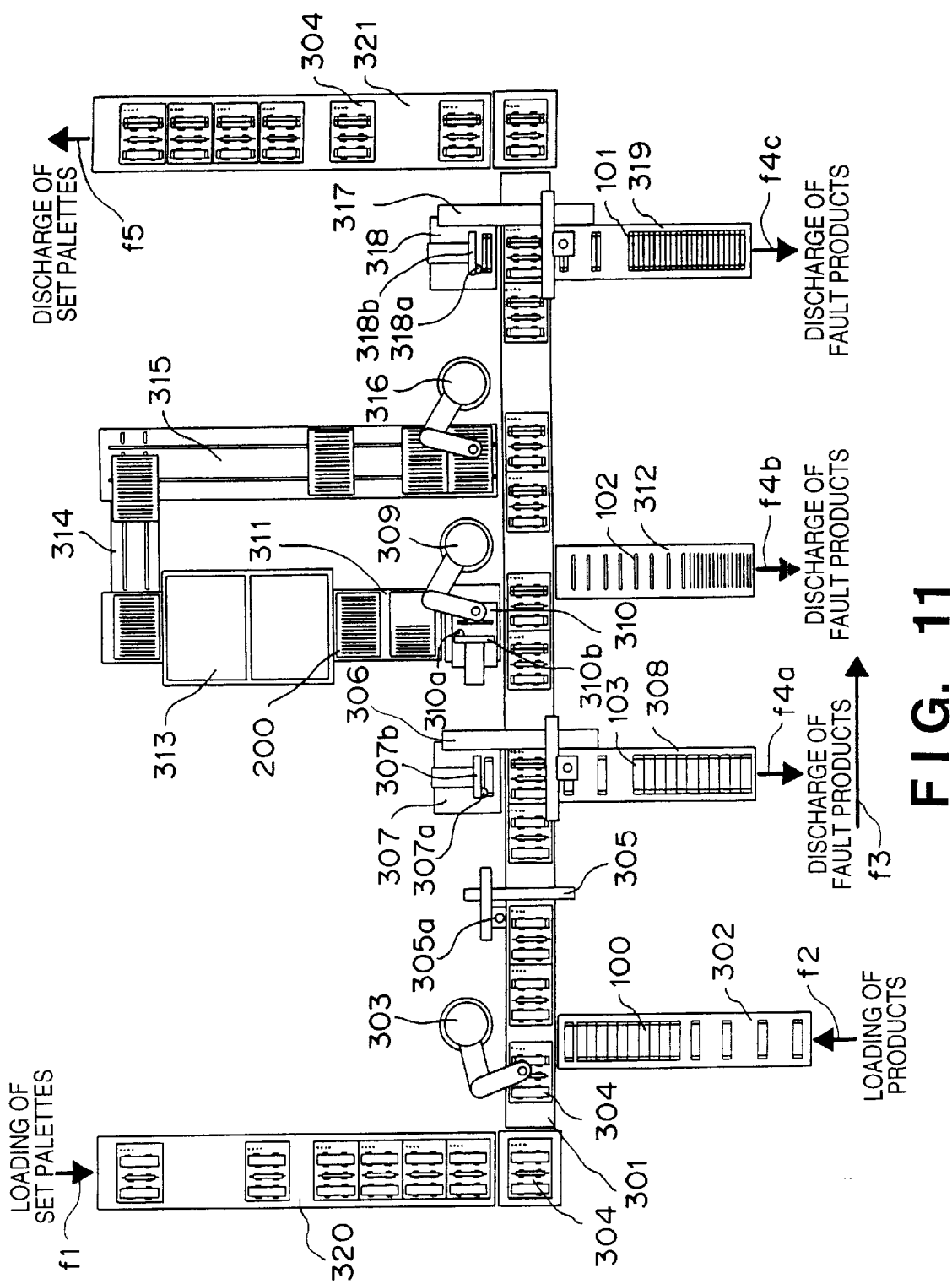
FIG. 11 is a schematic view showing a construction of a product disassembling apparatus according to a third embodiment of the present invention.

FIG. 11 is a schematic view showing a construction of a product disassembling apparatus according to a third embodiment of the present invention.

In FIG. 11, reference numeral 301 denotes a disassembly carrying conveyor, 302 denotes a spent product loading conveyor, and 303 denotes a product loading robot for loading a spent product and taking out components from the product. Reference numeral 304 denotes a set palette which is carried on the disassembly carrying conveyor 301 through a series of work stations. In a robot working area of each work station, the set palette 304 is positioned and fixed in place by a positioning unit (not shown). Reference numeral 305 denotes a screw removing robot, and 305a denotes a screw removing device attached to the screw removing robot 305. The screw removing device 305a is constructed so as to unfasten screws by rotating a bit of a conventional automatic screw fastening device backward, and to take out the unfastened screws through a pipe-shaped bit cover while attracting the screws. The screw removing device can be realized with functions equivalent to those of the conventional screw fastening device, and hence it is not described here in more detail.

Reference numeral 306 denotes a first disassembling robot, 307 denotes a first component inspecting device for inspecting a taken-out component, and 307a denotes a first inspecting head which comprises an optical reading unit in this embodiment. The first inspecting head 307a is scanned by a first inspecting head moving mechanism 307b to carry out surface inspection of the component to be inspected.

Reference numeral 308 denotes a first fault component containing portion. Reference numeral 309 denotes a second disassembling robot, 310 denotes a second component inspecting device for inspecting a taken-out component, 310a denotes a second inspecting head, 310b denotes a second inspecting head moving mechanism, 311 denotes a cleaned component loading conveyor which is connected to a cleaning apparatus (described later), and 312 denotes a second fault component containing portion.

Reference numeral 313 denotes a cleaning apparatus, 314 denotes a cleaned component discharge conveyor, 315 denotes a cleaned component aligning conveyor, 316 denotes a first transfer robot. Further, reference numeral 317 denotes a second transfer robot, 318 denotes a third component inspecting device for inspecting a taken-out component, 318a denotes a third inspecting head, 318b denotes a third inspecting head moving mechanism, and 319 denotes a third fault component containing portion.

Figure 12:
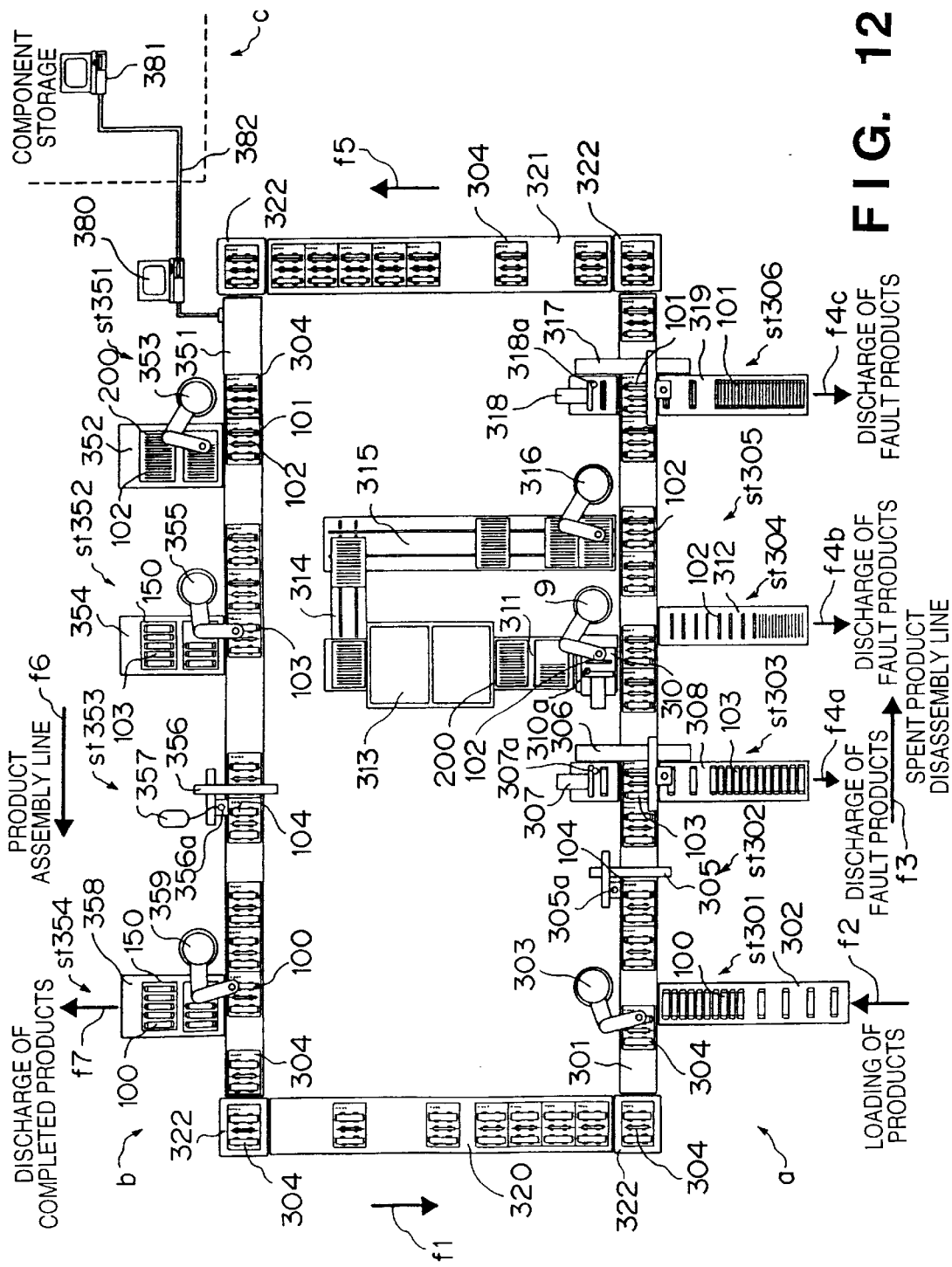
FIG. 12 is a schematic view showing an entire construction of a system according to the third embodiment of the present invention.

FIG. 12 is a schematic view showing an entire construction of a system according to the third embodiment of the present invention.

Parallel to a product disassembly line a primarily constructed of the disassembly carrying conveyor 301, described above in connection with FIG. 11, there is a product assembly line b primarily constructed of the assembly carrying conveyor 351. The lines a and b are connected to each other by a set palette loading conveyor 320 and a set palette discharge conveyor 321 through set palette transfer modules 322. Thus, those four conveyors are interconnected in the form of a loop so that the system has a structure capable of circulating the set palette 304. In addition to the above lines a and b, a component storage is installed, though not shown in detail, as indicated by c.

Reference numeral 352 denotes a first component supply stocker, 353 denotes a first assembling robot, 354 denotes a second component supply stocker, 355 denotes a second assembling robot, 356 denotes a screw fastening robot, 356a denotes a screw fastening device attached to the screw fastening robot 356, 357 denotes a screw supply hopper, 358 denotes a third component supply stocker, and 359 denotes a third assembling robot.

Reference numerals 150 and 200 denote a tray magazine and a cleaning tray magazine, respectively, which are the same as those described above in connection with the first embodiment. The cleaning tray magazine 200 has the same structure as shown in FIGS. 2 and 3.

Also, reference numeral 100 denotes a product to be assembled which is the same as shown in FIG. 6 in connection with the first embodiment.

Details of the set palette 304 will now be described with reference to FIGS. 13 and 14, taking the product 100 as an example.

Figure 13:
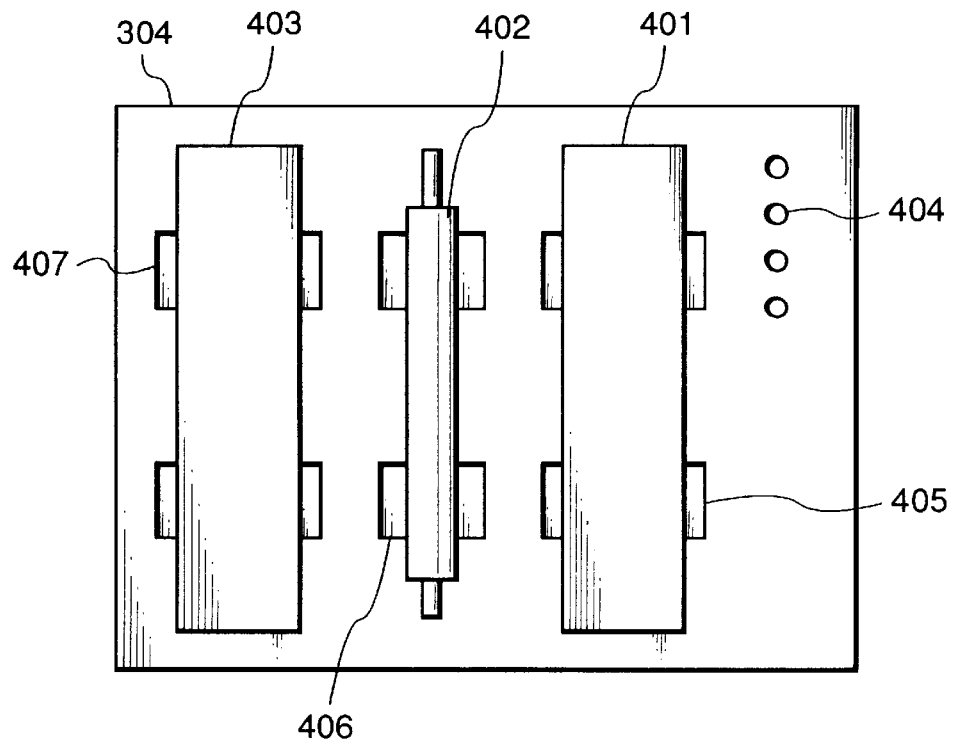
FIG. 13 is a view showing a detailed structure of a set palette.
Figure 14:
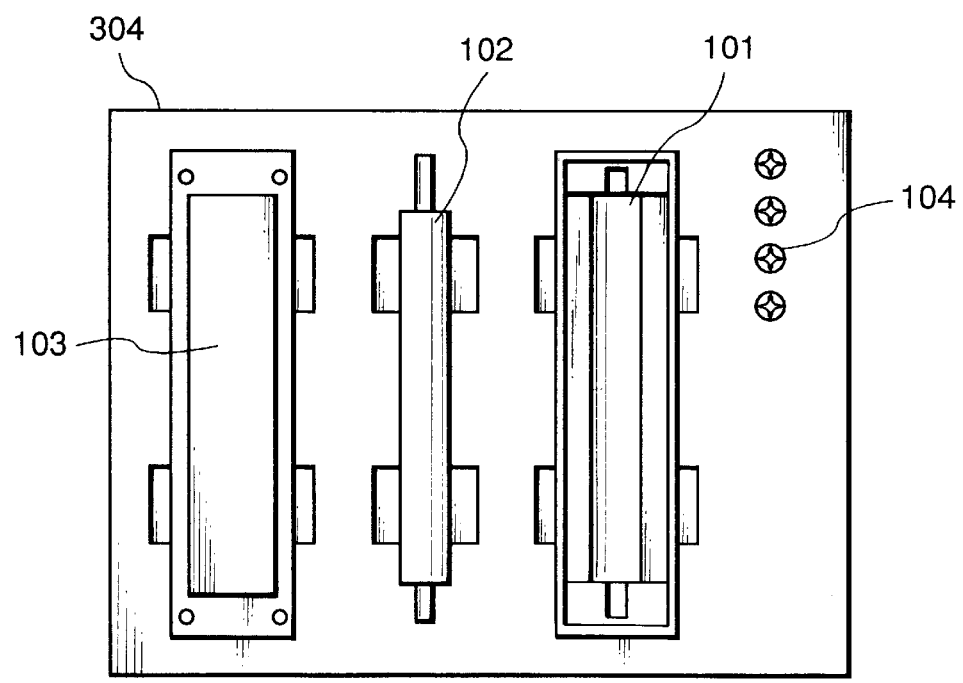
FIG. 14 is a view showing the detailed structure of the set palette.

In FIG. 13, reference numeral 401 denotes a portion for positioning and holding the product 100 before disassembly or a housing 101 after disassembly, 402 denotes a portion for positioning and holding a roller component 102, 403 denotes a portion for positioning and holding a housing cover 103, and 404 denotes a portion for positioning and holding each of four screws 104. Also, reference numerals 405, 406, 407 denote clearances formed in the respective holding portions so that fingers of a robot hand are kept from hitting against the holding portions when the corresponding components are placed in or taken out of the respective holding portions. FIG. 14 shows a state where the corresponding components are held in the respective holding portions while they are properly positioned.

Next, a configuration adapted to manage and control the operation of the entire system will be described with reference to FIG. 15.

In FIG. 15, reference numeral 380 denotes a product assembly line managing computer and 381 denotes a component storage managing computer, these computers being interconnected via a floor LAN 382. This can also be seen from the schematic view of the entire system shown in FIG. 12 which indicates a system configuration including the positions where the computers are installed. Describing the system in more detail, reference numeral 390 denotes a component delivery request processing portion which located in the product assembly line managing computer and is connected via a product assembly line LAN 391 to station controllers 392a–392e each provided in corresponding one of stations of the product assembly line. Reference numeral 393 denotes a component conveyance managing portion and 394 denotes an unmanned carrier control portion, these portions 393 and 394 being located in the component storage managing computer and being able to communicate with unmanned carriers 395 (not shown in FIG. 12) which carry magazine trays between the component storage 70 and the product assembly line b.

Figure 16:
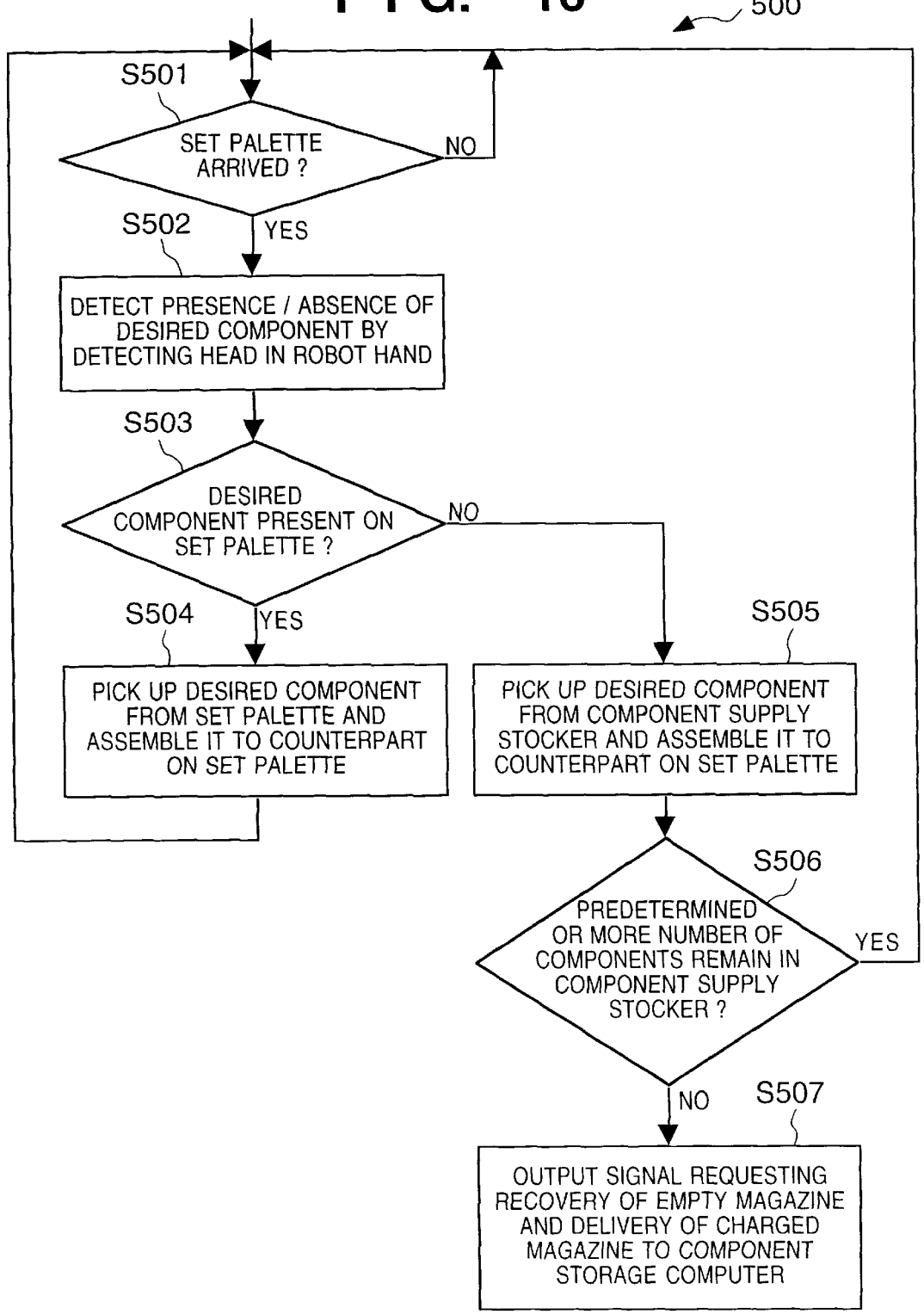
FIG. 16 is a flowchart showing the component presence/absence monitoring operation of a product assembly line managing computer.

The operation of processes for spent product disassembling work and product assembling work according to the third embodiment will now be described with reference to FIG. 12 showing the entire system and FIG. 16 showing a flowchart of the operation.

The operation of the spent product disassembly line a will be first described.

In a first station st301, the products 100 to be disassembled are loaded onto the spent product loading conveyor 302 as indicated by a product loading flow f2. The loaded products 100 are picked up by the product loading robot 303 one by one and are each placed in the set palette 304, i.e., its portion 401 for positioning and holding the product before disassembly, which is positioned on the disassembly carrying conveyor 301 in a point corresponding to the first station st301. Then, the set palette 304 is conveyed in a direction indicated by a flow f3 until reaching a second station st302. Upon reaching the second station st302, the set palette 304 is positioned by positioning means (not shown) in a ipoint corresponding to the second station st302 (while such steps of conveying and positioning the set palette 304 are performed in the succeeding process as well, a description of those steps will not be repeated because those steps are performed in the same manner as described above).

In the second station st302, the screw removing robot 305 removes the four screws 104 by using the screw removing device 305a, and then puts the removed screws in the screw positioning/holding portions 404 of the set palette 304.

In a third station st303, the first disassembling robot 306 removes the housing cover 103 and places the removed housing cover 103 in a component positioning portion of the first component inspecting device 307. The above-described component inspection is performed here by the first component inspecting device 307. If a result of the inspection is acceptable, the first disassembling robot 306 places the picked-up housing cover 103 in the housing cover positioning/holding portion 402 of the set palette 304. On the other hand, if a result of the inspection is not acceptable, the first disassembling robot 306 places the picked-up fault housing cover 103 in the first fault component containing portion 308.

In a fourth station st304, the second disassembling robot 309 removes the roller component 102 and places the removed roller component 102 in a component positioning portion of the second component inspecting device 310. The above-described component inspection is performed here by the second component inspecting device 310. If a result of the inspection is acceptable, the second disassembling robot 309 places the picked-up good roller component 102 in a vacant space of the cleaning tray magazine 200 while properly positioning it, the cleaning tray magazine 200 being positioned on the cleaned component loading conveyor 311 which serves as a good component containing portion. On the other hand, if a result of the inspection is not acceptable, the second disassembling robot 309 places the picked-up fault roller component 102 in the second fault component containing portion 312.

When the cleaning tray magazine 200 is filled with the good roller components 102, the cleaned component loading conveyor 311 is actuated to move the cleaning tray magazine 200 into the cleaning apparatus 313. The cleaned roller components 102 are sent to the cleaned component aligning conveyor 315 via the cleaned component discharge conveyor 314. The head one of the cleaning tray magazines 200 on the cleaned component aligning conveyor 315 is positioned and locked in a robot movable area of a next fifth station st305.

In the fifth station st305, the first transfer robot 316 picks up one of the cleaned roller components 102 from the cleaning tray magazine 200 positioned at the head point of the cleaned component aligning conveyor 315, and places it in the roller component positioning/holding portion 402 of the set palette 304.

In a sixth station st306, the second transfer robot 317 picks up the housing 101 from the set palette 4 and places the picked-up housing 101 in a component positioning portion of the third component inspecting device 318. The above-described component inspection is performed here by the third component inspecting device 318. If a result of the inspection is acceptable, the second transfer robot 317 places the picked-up housing 101 in the housing positioning/holding portion 401 of the set palette 304. On the other hand, if a result of the inspection is not acceptable, the second transfer robot 317 places the picked-up fault housing 101 in the third fault component containing portion 319.

With the above-described process from the first station st301 to the sixth station st306, the product 100 loaded on the set palette 304 to be disassembled is successively disassembled, and its components are taken out and inspected. The inspected good components are then placed in the respective component positioning/holding portions of the set palette. This results in the state of the set palette shown in FIG. 14. If the component is found to be faulty as a result of the inspecting step of each station, the set palette has a vacant space in the corresponding positioning/holding portion. Despite the presence of a vacant space, the set palette is conveyed to a next step as it is.

The set palette 304 is then carried onto the assembly carrying conveyor 351 via the set palette transfer module 322 and the set palette discharge conveyor 321 for transition to a process of the subsequent product assembly line b.

The operation of the product assembly line b will be next described.

In a first station st351, the first assembling robot 353 picks up the roller component 102 from the set palette 304 which is positioned on the assembly carrying conveyor 351, and assembles the picked-up roller component 102 to the housing 101 on the set palette 304. If the roller component positioning/holding portion 402 of the set palette 304 is vacant, i.e., if the roller component 102 is not present on the set palette 304, the first assembling robot 353 picks up one roller component 102 from the cleaning tray magazine 200 which is positioned on the first component supply stocker 352, and assembles the picked-up roller component 102 to the housing 101 on the set palette 304 which is positioned on the assembly carrying conveyor 351.

Then, the set palette 304 is conveyed in a direction indicated by a flow f6 until reaching a second station st352. Upon reaching the second station st352, the set palette 304 is positioned by positioning means (not shown) in a point corresponding to the second station st352 (while such steps of conveying and positioning the set palette 304 are performed in the succeeding process as well, a description of those steps will not be repeated because those steps are performed in the same manner as described above).

In the second station st352, the second assembling robot 355 picks up one housing cover 103 from the set palette 304 which is positioned on the assembly carrying conveyor 351, and assembles the picked-up housing cover 103 to the housing 101 on the set palette 304. As with the above first station st351, if the housing cover 103 is not present on the set palette 304, the second assembling robot 355 picks up one housing cover 103 from the second component supply stocker 354, and assembles the picked-up housing cover 103 to the housing 101.

In a third station st353, the screw fastening robot 356 picks up the four screws 104 successively from the set palette 304 which is positioned on the assembly carrying conveyor 351, and fastens the screws 104 to the housing 101 on the set palette 304, thereby fixing the housing cover 103 and the housing 101 together. As with the above case, if the screws 104 are not present on the set palette 304, they are supplied from the screw supply hopper 357.

In a fourth station st354, the third assembling robot 359 picks up the assembled housing 101 from the set palette 304 which is positioned on the assembly carrying conveyor 351, and places the picked-up housing 101 in the tray magazine 150 while properly positioning it, the tray magazine 150 being positioned on the third component supply stocker 358. At this time, the third component supply stocker 358 serves as a component discharge stocker.

The set palette 304 is then carried onto the disassembly carrying conveyor 301 via the set palette transfer module 322 and the set palette loading conveyor 320 for return to the process of the product disassembly line a.

The operation of monitoring the presence/absence of the assembled component in the product assembly line b will be next described.

The flowchart of FIG. 16 shows a component presence/absence monitoring flow 500 executed by the product assembly line managing computer.

The flow process is executed through communication between the station controllers 392 in the respective stations of the product assembly line b and the component delivery request processing portion 390 in the product assembly line managing computer 380. The following steps S501 to S506 are executed in the station controllers 92, while the following step S507 is executed in the component delivery request processing portion 390.

In the step S501, whether the set palette 304 is positioned in a prescribed position on the assembly carrying conveyor 351 is determined in response to a signal from a positioning unit (not shown). If the set palette 304 has arrived, the flow proceeds to the next step.

In the step S502, the assembling robot checks by a detecting head provided in a robot hand (not shown) whether the component to be assembled in the relevant station (i.e., the desired component) is present on the set palette 304.

Depending on a result of the check, the flow proceeds from the step S503 to the step S504 if the component to be assembled is present on the set palette 304, and to the step S505 if not.

In the step S504, the assembling robot picks up the desired component on the set palette 304, and assembles the picked-up component to the housing 101 which is a counterpart for assembly. After the assembly, the flow returns to the step S501.

In the step S505, the assembling robot picks up the assembled component from the component supply stocker, and assembles the picked-up component to the housing 101 which is placed on the set palette 304 and is a counterpart for assembly.

In the step S506, at the time the component is taken out from the component supply stocker, it is checked whether the component still remains in the component supply stocker in a predetermined or more number. This check is made with the aid of a not-shown unit for counting the number of components supplied. If there still remain a predetermined or more number of components, the flow returns to the step S501. If the number of components remaining is less than the predetermined value, the station controller 392 outputs a signal to the component delivery request processing portion 390 via communication, following which the flow proceeds to the next step S507.

In the step S507, the component delivery request processing portion 390 outputs a signal requesting recovery of the empty tray magazine and delivery of a new charged tray magazine to the component storage managing computer 381 via the floor LAN 382. After that, the unmanned carrier (not shows) is controlled to carry the component, which is requested and delivered from the component storage, to the station issuing the request for delivery, and to recover the empty tray magazine from that station in the return path for return to the component storage.

With the operations described above, the spent product disassembly line a implements disassembly of products, and the product assembly line b implements assembly of products. The components automatically picked up by the robots from the set palette 304 in the spent product disassembly line a are successively placed back in the respective component positioning/holding portions of the set palette. In the product assembly line b, the assembling robots successively pick up components from the respective component positioning/ holding portions of the set palette 304, and assembles the picked-up components to a counterpart for assembly which is placed on the set palette 304. Furthermore, the components picked up by the robots in the spent product disassembly line a are inspected, if necessary, and then cleaned, if necessary, before being placed back in the respective component positioning/holding portions of the set palette.

(Fourth Embodiment)

Figure 17:
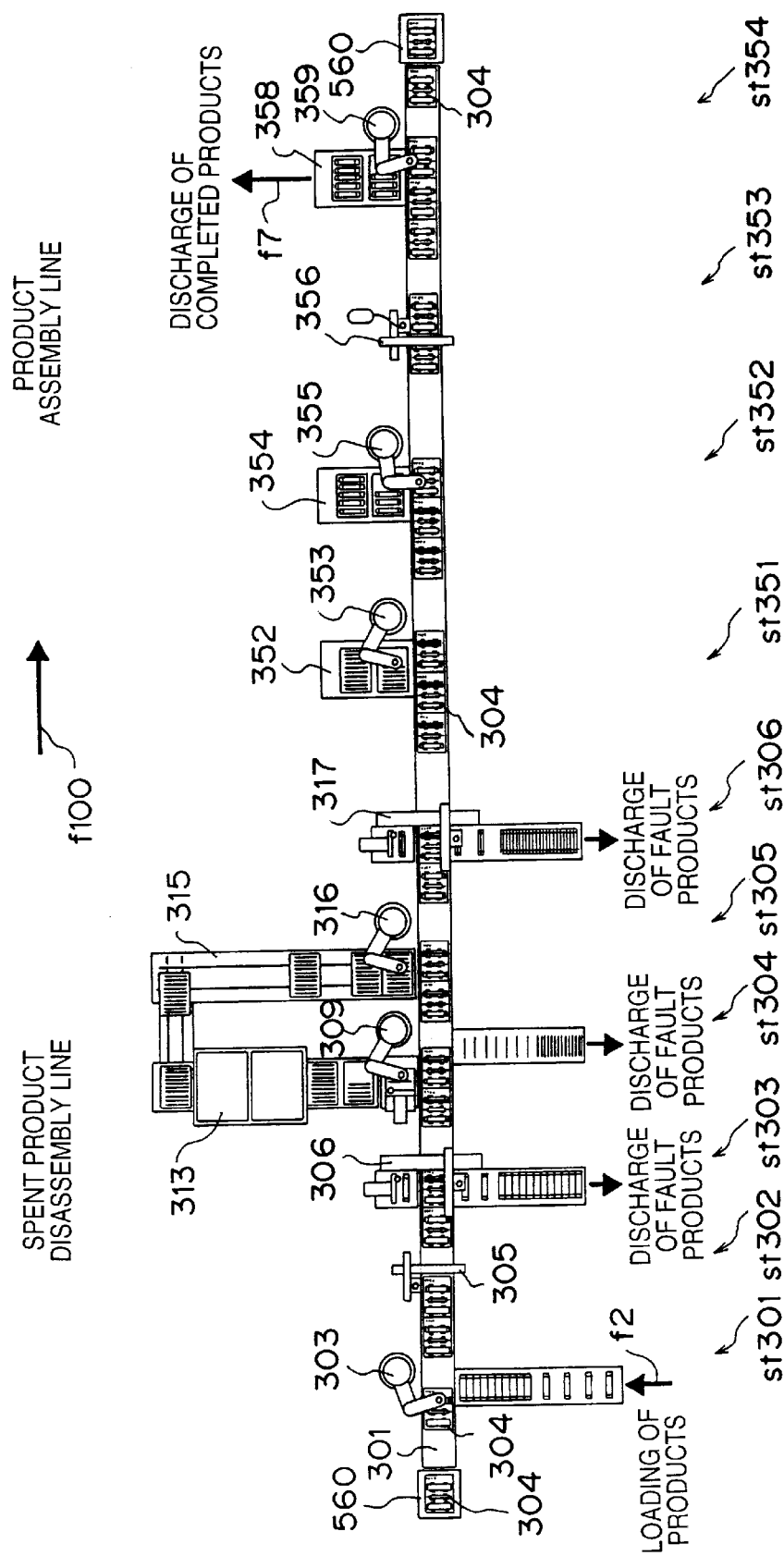
FIG. 17 is a schematic view showing an entire construction of a system according to a fourth embodiment of the present invention.

A fourth embodiment is shown in FIG. 17, and will be described below only about differences from the third embodiment.

In the first embodiment, the processes ranging from disassembly to assembly are constructed in the form of a loop by interconnecting the product disassembly line a and the product assembly line b through the set palette loading conveyor and the set palette discharge conveyor. As an alternative, the entire system may be constructed by directly connecting the spent product disassembly line a and the product assembly line b in tandem, as shown in FIG. 17. In this embodiment, set palettes are conveyed in a direction indicated by f100, and set palette elevating units denoted by 560 are provided at the upstream and downstream ends of the entire line. The set palettes are circulated by a return conveyor (not shown) laid below the conveyor 301. Comparing with the third embodiment, this fourth embodiment is advantageous in that maintenance, etc. of the system equipment is easier to implement because the stations are accessible from both sides of the line.

(Fifth Embodiment)

The above first to fourth embodiments have been described on the recycling system which includes a line for disassembling spent products line and a product assembly line for assembling new products by reusing components disassembled from the spent products. On the other hand, this fifth embodiment is related to the form of products which are capable of being easily disassembled for easier recycling.

Drums, rollers, sleeves and so on used in image forming apparatus are very expensive components, and from the environmental point of view, it is desired to reuse those components as they are. However, those components are fixedly supported to side plates of a container and have a difficulty in removing them with ease.

The above components can be removed by breaking off the side plates, but a method of disassembling such components with satisfactory working efficiency without damaging the components has not yet been proposed.

The present embodiment describes the method of disassembling parts without damaging the parts, while facilitating the operability.

Figure 18:
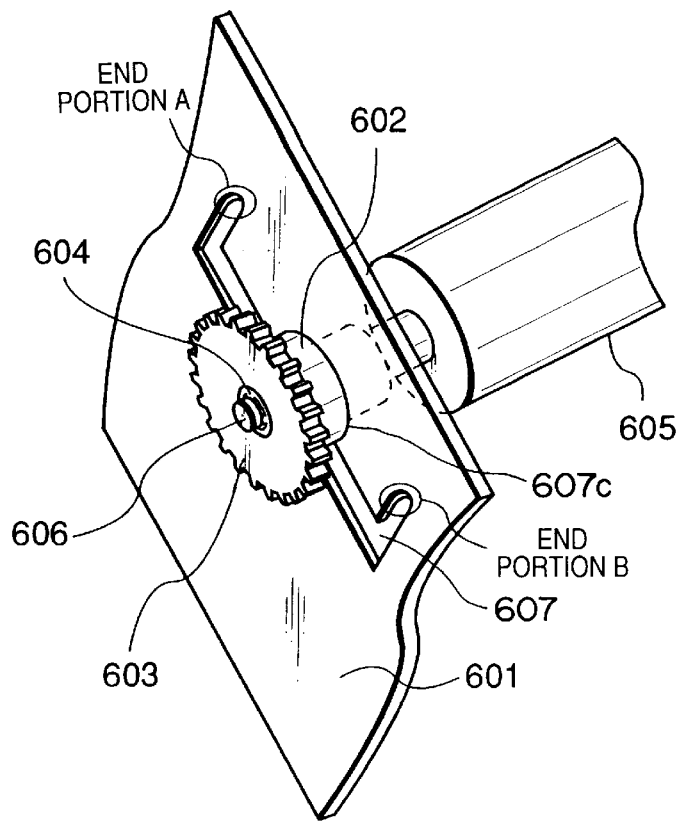
FIG. 18 is a perspective view showing an example of products to be disassembled.
Figure 19:
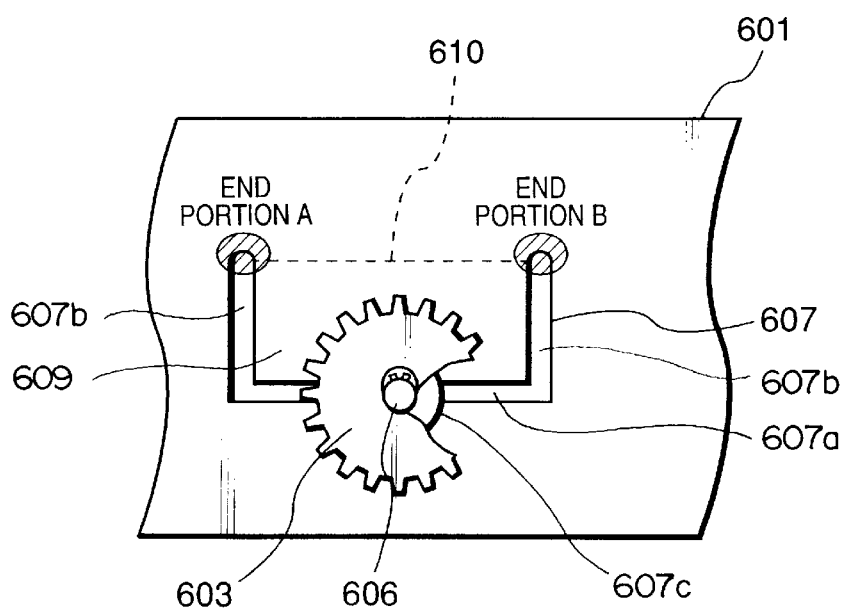
FIG. 19 is a view showing the example of products to be disassembled.

FIGS. 18 and 19 show an example of products which are formed to be capable of being easily disassembled according to the fifth embodiment. In the illustrated example, a roller unit fixedly supported to a housing for use in business machines, etc. is disassembled from the housing.

In FIGS. 18 and 19, reference numeral 601 denotes a housing, 602 denotes a bearing inserted in and supported to a circular hole 607c which is formed in the housing 601, 605 denotes a roller, such as a drum and a paper feed roller in copying machines, 606 denotes a shaft for supporting the roller 605, 603 denotes a gear for driving the shaft 606, and 604 denotes an Ering to prevent the gear 603 from slipping off in the thrust direction. Reference numeral 607 denotes a slit formed in the housing 601. The slit 607 is made up of a horizontal portion 607a extending horizontally from the circular hole 607c in which the bearing 602 is fixedly supported, and vertical portions 607b extending substantially vertically upward from opposite ends of the horizontal portion 607a.

A method of removing a roller-like member from the housing 601 will be described below.

By cutting the housing 601 along a straight line 610 connecting both end portions A and B of the slit vertical portions 607b shown in FIG. 19, a roller unit (including the bearing 602, the roller 605, the shaft 606, the gear 605 and the E-ring 604) is disassembled from the housing 601. The cutting can be performed by using a cutter (end mill or slitter), a saw, pliers, a laser beam, etc. If the housing 601 is made of plastics, a heated iron or the like is also usable to cut the housing. In this connection, it is required for the horizontal portion 607*a* and the vertical portions 607*b* of the slit to be designed to have such lengths as allowing free motion of the cutting tool used. Also, to take out the roller unit after cutting the housing 601 along the straight line 610, a cutout area 609 surrounded by the slit horizontal portion 607*a*, the slit vertical portions 607*b* and the straight line 610 is required to be sized so that the gear 603 having a larger diameter than the bearing 602 can pass through the cutout area 609. To this end, the lengths of the horizontal portion 607*a* and the vertical portions 607*b* must be selected in consideration of the outer diameter of the gear 603 as well.

The strength of the housing 601 depending on a shape of the slit 607 will now be described.

When a roller unit is assembled in a business machine such as a copying machine, forces imposed on the housing 601 are mainly dominated by the force acting in the direction of gravity due to the weight of a roller unit body. It is therefore important to set the shape of the slit 607 such that when the roller unit is assembled in place as a product, the slit horizontal portion 607*a* lies nearly in the horizontal direction vertical to the direction of gravity. By forming the slit 607 to extend nearly horizontally, the weight of the roller unit can be borne by a lower edge of the slit horizontal portion 607*a*, and hence the housing 601 can have substantially the same strength as obtained when no slit is formed.

Considering the force acting in a direction vertical to the drawing sheet, the slit vertical portions 607*b* are preferably positioned above the slit horizontal portion 607*a*. Further, the slit vertical portions 607*b* are preferably as short as possible because the strength of the housing 601 in the direction vertical to the drawing sheet is weakened as the length of the slit vertical portions 607*b* increases.

Figure 20:
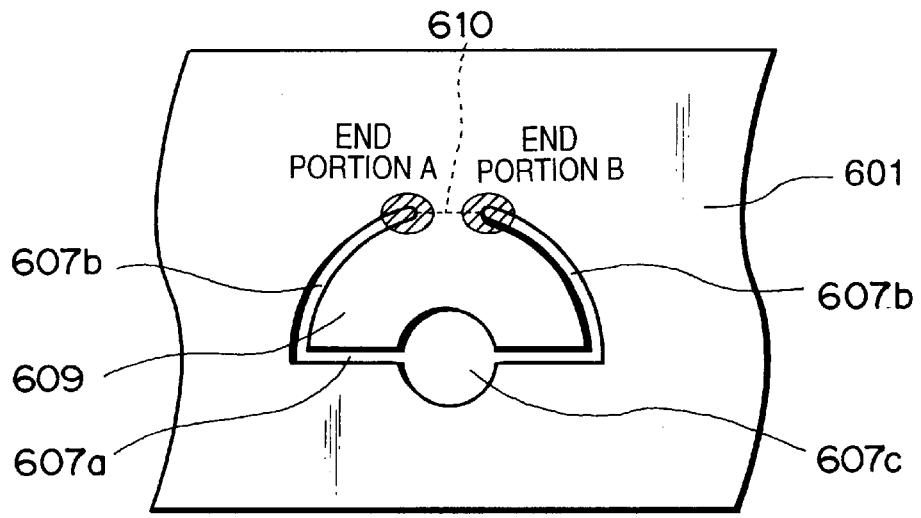
FIG. 20 is a view showing a modification of a fifth embodiment.
Figure 21:
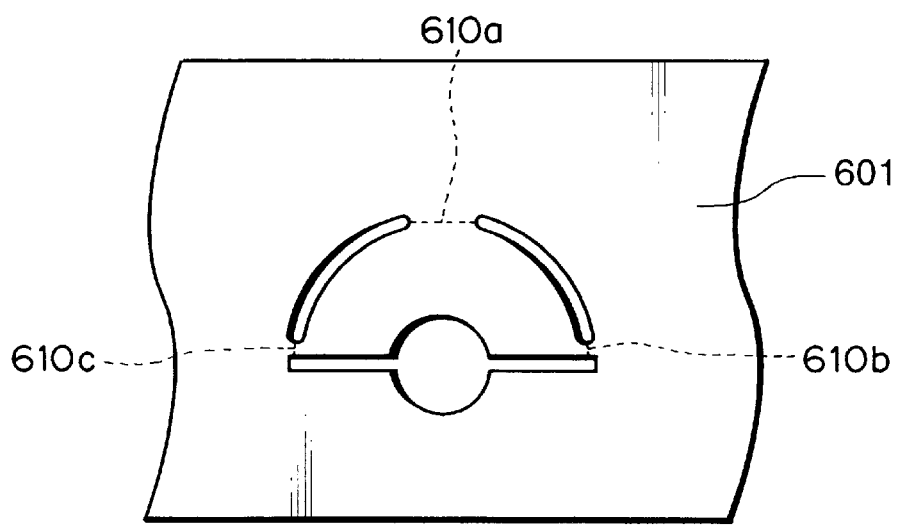
FIG. 21 is a view showing another modification of the fifth embodiment.

FIGS. 20 and 21 show modifications of the fifth embodiment in each of which the slit shape is modified from that shown in FIGS. 18 and 19.

In the modification of FIG. 20, slits 607*b* extending from the opposite ends of the slit horizontal portion 607*a* are arc-shaped such that both end portions A and B of the slits 607*b* are positioned to come closer. With such a slit shape, the straight line 610 along which the housing 601 is to be cut becomes very short, and cutting work can be finished in a shorter time, resulting in improved working efficiency. While the slits 607*b* are arc-shaped in the illustrated modification, they may be formed linearly.

In the modification of FIG. 20, the strength of the housing 601 in the direction vertical to the drawing sheet is relatively weakened. To avoid such a problem, three cut portions (610*a*, 610*b*, 610*c*) may be provided between slit portions, as shown in FIG. 21. With this case, because there are three cut portions, working efficiency is inferior to the case of FIG. 20, but the strength of the housing 601 in the direction vertical to the drawing sheet is remarkably increased. While three cut portions are provided in the illustrated modification, the number of cut portions is not limited to three.

It is to be noted that the slit shape shown in FIGS. 19, 20 and 21, by way of example, can be set to an optimum shape depending on the material of the housing. and the shaft shape and weight of the roller unit.

(Sixth Embodiment)

Figure 22:
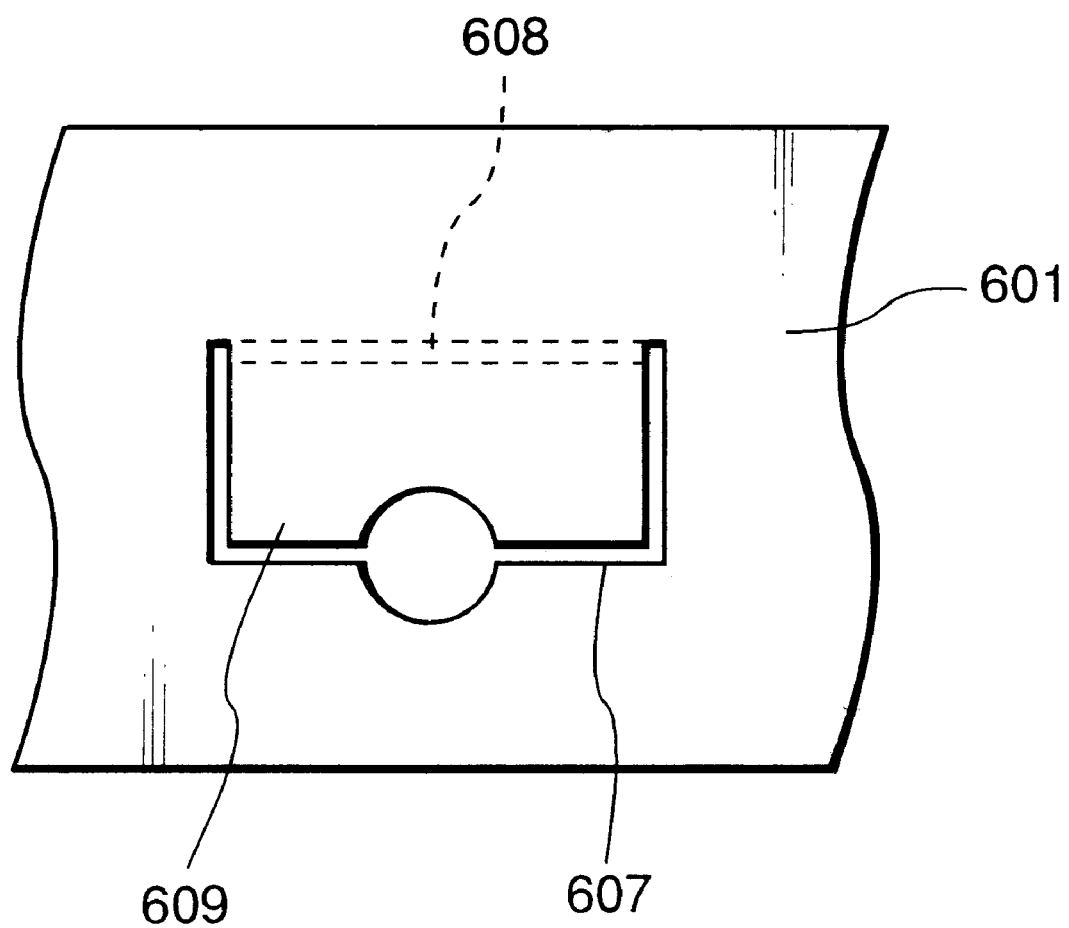
FIG. 22 is a view showing a sixth embodiment.

FIG. 22 shows a sixth embodiment which is improved in shape of the slit 607 in the fifth embodiment. A portion of the housing 601 along the straight line 608 connecting both the end portions A and B of the slit 607 is formed to have a thinner wall. Therefore, an area 609 surrounded by the slit 607 and the thinner-wall portion 608 can be easily removed (or bent) by applying a load to the area 609 in a direction vertical to the drawing sheet, thus enabling the roller unit to be easily disassembled from the housing 601. Comparing with the fifth embodiment, this sixth embodiment is advantageous in that because it is just required to apply a load to the area 609, a simple cutting tool is usable, and depending on cases, a cutting tool is not needed. Accordingly, working efficiency is further improved. The thinner-wall portion 608 is not limited to the structure having a thinned wall, but may be provided in a structure having an acute groove formed from a rear surface of the housing.

Figure 23:
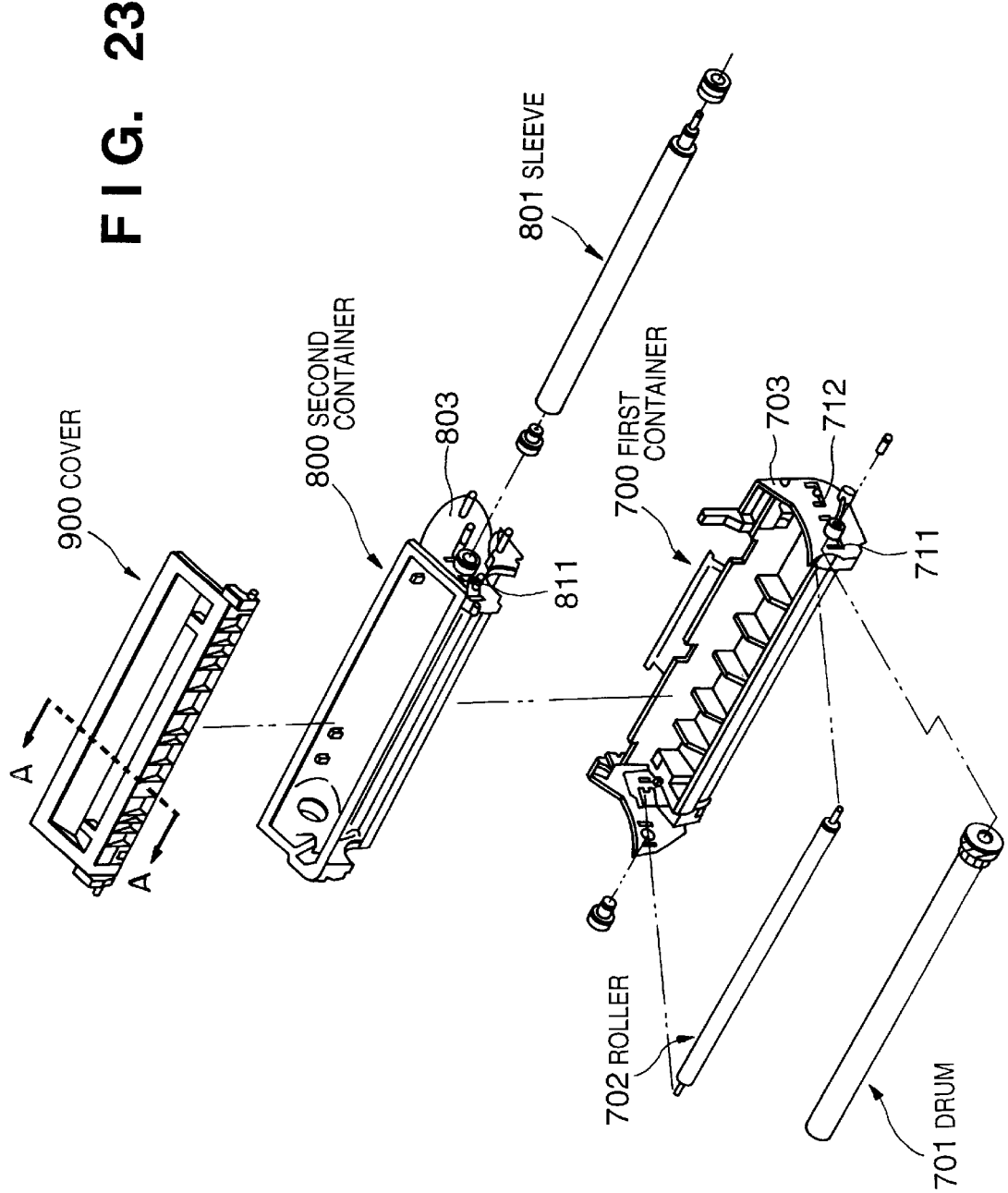
FIG. 23 is an exploded perspective view of a toner cartridge.
Figure 24:
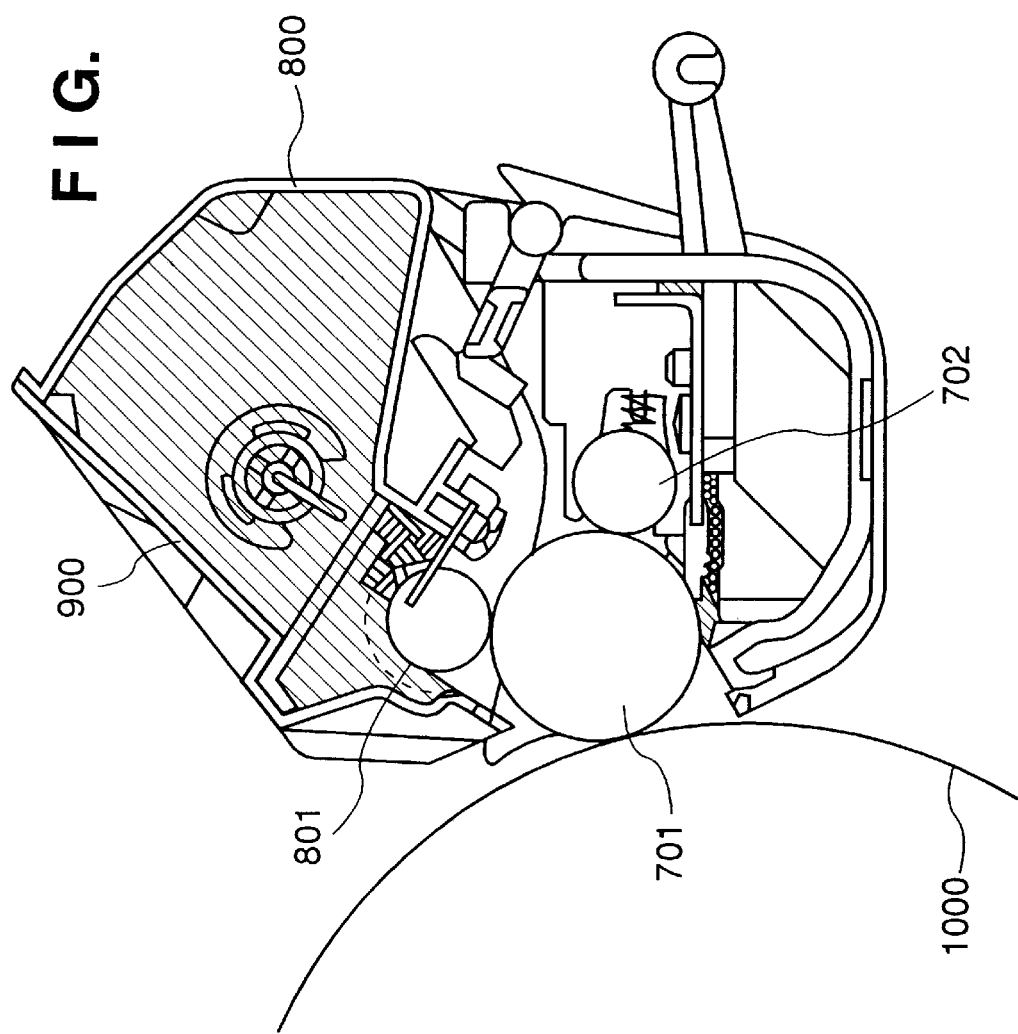
FIG. 24 is a sectional view taken along line A—A in FIG. 23.

The structure of supporting a roller unit by a housing is often employed in many home electrical machines and business machines such as printers, copying machines, word processors, facsimiles and printers. FIGS. 23 and 24 show, by way of example, a toner cartridge used in a laser beam printer, etc. as an expendable unit.

FIG. 23 is an exploded perspective view of the toner cartridge.

The toner cartridge comprises a first container 700, a second container 800 and a cover 900 which are assembled and fixed by screwing or welding into a onepiece unit.

In the first container 700 made of plastics, there are assembled a drum 701 which primarily supports a function for receiving light information of characters or images and representing the light information as a visible image on a sheet of paper, and a charging roller 702 for applying a high potential to the drum 701. The drum 701 and the charging roller 702 are fixedly supported to a side plate 703 of the first container 700 by structures including slits 711, 712 which are each similar to the slit 607 shown in any one of FIGS. 18 to 21.

In the second container 800 made of plastics, a sleeve 801 for uniformly supplying toner to the drum 701 is fixedly supported to a side plate 803 of the second container 800 by a structure including a slit 811 which is similar to the slit 607 shown in any one of FIGS. 18 to 21.

FIG. 24 is a sectional view of the toner cartridge taken along line A—A in FIG. 23, the view showing a state of drawing an image on a sheet of paper 1000. In FIG. 24, a hatched area indicates a toner supply portion. Toner is deposited on the sheet of paper 1000 through the sleeve 801 and the drum 701.

The side plates 703, 803 usually have a thickness of 1 mm to 2 mm. In this case, the strength of the side plate is not practically problematic if each slit has a width of 0.1 mm to 1 mm and the cut portion 610 has a width twice or more as thick as the plate thickness. Where it is desired to make the width of the cut portion narrower, a rib may be provided on the rear side of the side plate to ensure a sufficient strength.

While the sixth embodiment has been described in connection with the toner cartridge for use in laser printers, this embodiment is also applicable to drums, charging rollers, developing rollers, feed rollers, carriage bars, etc. which are used in other machines such as copying machines, word processors and facsimiles.

(Seventh Embodiment)

Figure 25:
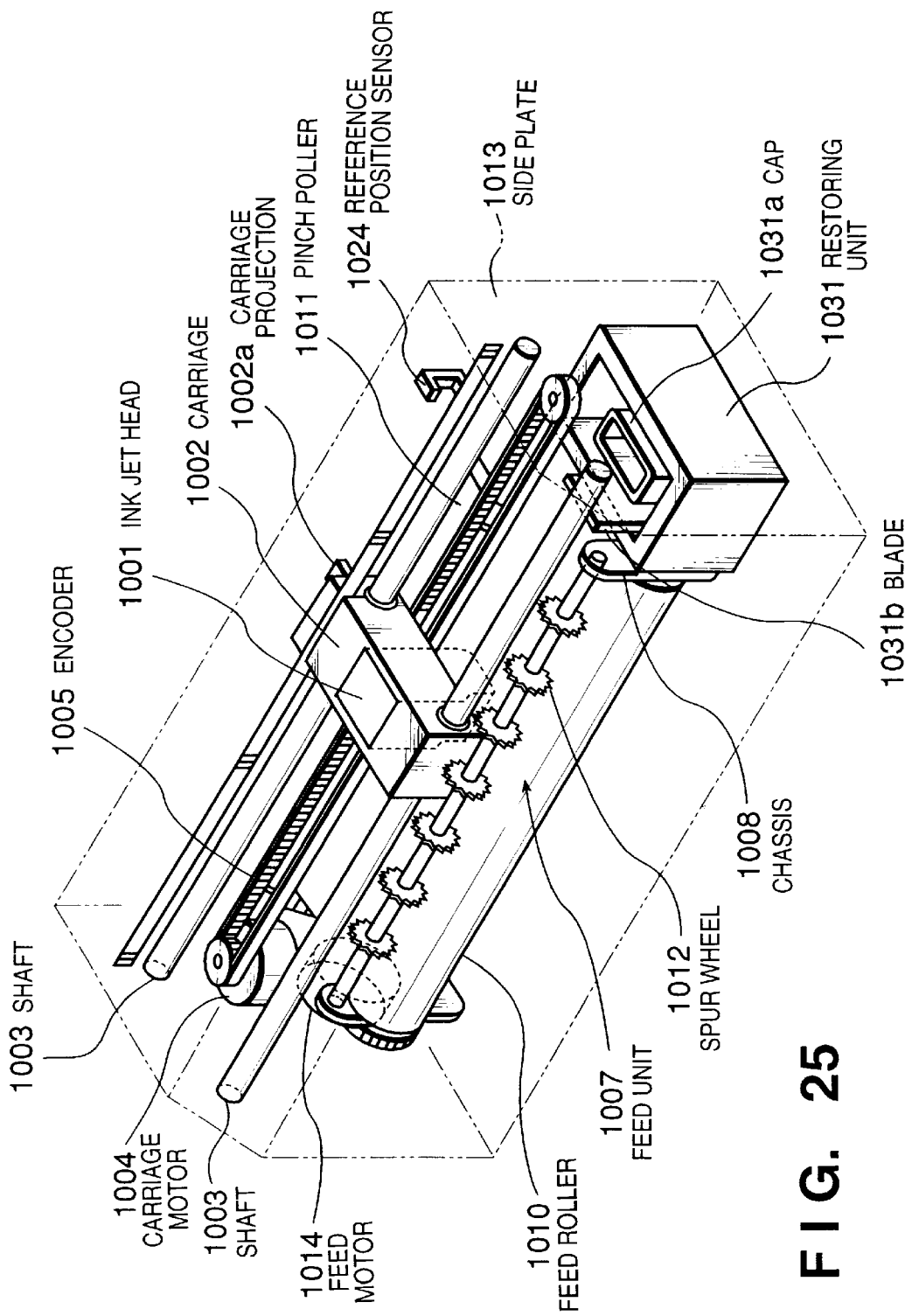
FIG. 25 is a schematic perspective view of a printer.

A seventh embodiment, in which the present invention is applied to a printer, will be described below with reference to FIGS. 25 and 26. FIG. 25 is a schematic perspective view of a printer, and FIG. 26 is a side view of the printer.

In FIG. 25, reference numeral 1002 denotes a carriage on which an ink jet head 1001 is mounted, and 1004 denotes a carriage motor for driving the carriage 1002. The carriage 1002 is movable in a direction of main scan along shafts 1003 supported by opposite side plates 1013. The reference position of the carriage 1002 is determined by detecting a projection 1002a projected on the carriage 1002 with a reference position sensor 1024, and on the basis of the reference position, the printing or reading range of the carriage 1002 is determined under position control using an encoder 1005.

A feed unit 1007 is disposed in a position opposed to the carriage 1002, and a sheet of printing paper or read document passes between the feed unit 1007 and the carriage 1002. The feed unit 1007 is supported at both ends by a chassis 1008, and comprises two feed rollers 1010, a pinch roller 1011, a spur wheel 1012 and a feed motor 1014.

Further, a print head restoring unit 1031 is provided adjacent to the feed unit 1007. A cap 1031a assembled in the print head restoring unit 1031 sucks ink from the ink jet head 1001 while covering an ink ejection face of the ink jet head 1001, so that the ink jet head 1001 is restored to be ready for printing. Additionally, a blade 1031b provided aside the cap 1031a wipes the ink adhering to the ink jet head 1001.

For moving the carriage 1002 with high accuracy, the shafts 1003 are each required to have a highly accurate surface roughness, diameter, straightness and roundness. Also, the feed rollers 1010, the pinch roller 1011 and the spur wheel 1012 are very expensive and hence deserve reuse.

As shown in FIG. 26, therefore, a portion 1003A of the side plate 1013 to which the shaft 1003 is attached, and portions 101A, 1012A of the chassis 1008 to which the feed rollers 1010, the pinch roller 1011 and the spur wheel 1012 are attached, are each formed to have a structure including the slit 607 shown in any one of FIGS. 18 to 21. As a result, those components can be easily removed for reuse.

According to the present invention, as described above, it is realized to automatically disassemble spent products and to take out components from the spent products with the view of reusing the taken-out components in new products. Also, since the taken-out components are placed in a component containing box while being properly positioned, i.e., since the taken-out components are carried in an aligned state, it is possible to easily handle the components in the same posture in subsequent steps for inspection, cleaning, assembly, etc. without damaging the components.

Further, since a component inspecting device for inspecting the components picked up by a disassembling robot is provided to determine whether the taken-out components are good or not, quality of the taken-out components can be surely checked at a low cost during a series of steps for the disassembling operation.

Since the components picked up by the disassembling robot is placed in predetermined number in a component containing box and then they are cleaned in the line, the taken-out components can be cleaned at a low cost during a series of steps for the disassembling operation, and hence quality of the components can be ensured.

The component containing box which contains the components to be cleaned is made of a material suitable for cleaning of the components, and is formed to be capable of positioning the components so that a detergent is allowed to sufficiently act on any parts of each component to be cleaned. It is therefore possible to a cleaning palette and a carrying palette in common, to minimize the number of times of component handling during which the components are possibly damaged, and to realize simplification of the component carrying process.

Since component delivering means is provided to perform the operations of a spent product disassembly line and a product assembly line for synchronous production, the above advantage that the disassembled and taken-out components are placed in the component containing box while being properly positioned, can be more effectively utilized. Specifically, the component containing box used in the disassembly line can be used, as it is, as a component supply box in the assembly line, enabling the component carrying process to be controlled in a centralized manner. This also contributes to minimizing the number of times of component handling during which the components are possibly damaged, and to realizing simplification of the component carrying process. At the same time, the cost that has been required in a large amount for aligning the components in a conventional automatic assembly process can be reduced, and the total cost from disassembly to finished products can be cut down.

The component delivering means is controlled, in response to a component delivery request from the product assembly line, to deliver the requested components from the disassembly line when the requested components are present in the disassembly line in number meeting the number requested for delivery, and to deliver the requested components from component storage means when the requested components are not present in the disassembly line in number meeting the number requested for delivery. Accordingly, even when the number of components usable after disassembly is smaller than the number of components requested for assembly due to a poor yield of the components obtained by disassembling products, the requested components can be supplied in desired number from the component storage means. Thus, synchronous production using the assembly and disassembly lines can be continuously operated without affecting the assembly process of the products.

As a result, the present invention has succeeded in automatically disassembling spent products and taking out components from the spent products with the view of reusing the taken-out components in new products, improving quality of the taken-out components, as well as reducing the cost required for the reuse system.

In addition, the present invention can provide a product which is capable of being easily disassembled and reused, and a disassembling method for the product.

The present invention is not limited to the above embodiments and various changes and modifications can be made within the spirit and scope of the present invention. Therefore, to apprise the public of the scope of the present invention, the following claims are made.

What is claimed is:

1. A product capable of being easily disassembled, said product comprising an equipment body, an attachment member fixed to the equipment body and a functional component or a functional unit attached to the attachment member, wherein a through-slit is provided at a joint portion between said attachment member and said functional component or said functional unit to allow for a portion of said attachment member to be broken off and for said functional component or said functional unit to be removed from said attachment member.

2. The product capable of being easily disassembled according to claim 1, wherein said product is an image forming apparatus.

3. The product capable of being easily disassembled according to claim 1, wherein said functional unit is a developing unit.

4. The product capable of being easily disassembled according to claim 1, wherein said functional component is a photosensitive drum.

5. The product capable of being easily disassembled according to claim 1, wherein said functional component is a developing sleeve.

6. The product capable obeying easily disassembled according to claim 1, wherein said functional component is a roller for use in an image forming apparatus.

7. The product according to claim 1, wherein the through-slit extends from the joint portion in the proximate direction in which the weight of the functional component or the functional unit acts by gravity.

8. The product according to claim 7, wherein the functional component or the functional unit is taken out from the attachment member by cutting along a cut line which is defined by a line bridging end portions of the through-slit.

9. The product according to claim 8, wherein a portion proximate to the cut line is thinner than the other portions of the attachment member.

10. The product according to claim 8, wherein a region of a broken off portion defined by the through-slit and the cut line has an area not less than a cross-section of the functional component or the functional unit.

11. The product according to claim 7, wherein a portion of the through-slit to be cut is substantially horizontal to the direction in which the weight of the functional component or the functional unit acts by gravity.

12. The product according to claim 1, wherein the functional unit or the functional component is assembled in a process cartridge.

13. A product capable of being easily disassembled, wherein a functional component or a functional unit including a rotatable body is attached to an attachment member fixed to an equipment body, an opening is formed in said attachment member for attaching said rotatable body therein, and through-slits are formed to extend from the opening and allow for said functional component or said functional unit to be removed from said attachment member.

14. The product capable of being easily disassembled according to claim 13, wherein said product is an image forming apparatus.

15. The product capable of being easily disassembled according to claim 13, wherein a region of a broken off portion defined by the through-slits and a cut line, which is defined by a line bridging end portions of the through-slits, has an area not less than a cross-section of said functional component or functional unit.

16. The product capable of being easily disassembled according to claim 13, wherein a cut line bridging opposite ends of the slit is formed substantially horizontal to the direction in which the weight of equipment acts by gravity.

17. The product capable of being easily disassembled according to claim 13, wherein said functional unit or said functional component is assembled in a process cartridge.

18. A disassembling method for taking out, from equipment including a functional component or a functional unit, the functional component or the functional unit, comprising the steps of:
   providing an attachment member, to which the functional component or the functional unit is attached, with a through-slit at a joint portion between the attachment member and the functional component or the functional unit;
   cutting the attachment member along a line bridging end portions of the through-slit, allowing the functional component or the functional unit to be removed from the equipment; and
   taking out the functional component or the functional unit from the equipment through a cut off portion cut in the cutting step.

19. The disassembling method according to claim 18, wherein the equipment is an image forming apparatus.

20. The disassembling method according to claim 18, wherein said functional unit is a developing unit.

21. The disassembling method according to claim 18, wherein said functional component is a photosensitive drum.

22. The disassembling method according to claim 18, wherein said functional component is a developing sleeve.

23. The disassembling method according to claim 18, wherein said functional component is a roller for use in an image forming apparatus.

24. A product capable of being easily disassembled, wherein a functional unit including a rotatable body is attached to an attachment member, a rotating member is supported to said attachment member on the side opposite to said rotatable body, a slit is formed in a portion where said rotating member is supported by said attachment member, and said functional unit is removed by cutting said attachment member along a cut line interconnecting both end portions of said slit.

25. The product capable of being easily disassembled according to claim 24, wherein a region of a broken-off portion defined by the slit and the cut line is set to have an area not less than the area of a portion of said attachment member through which said functional unit or said rotating member is inserted.

26. The product capable of being easily disassembled according to claim 24, wherein a portion of the slit to be cut is formed nearly horizontal to the direction in which the weight of equipment acts by gravity.

27. The product capable of being easily disassembled according to claim 24, wherein said functional unit or said functional component is assembled in a process cartridge.

* * * * *

UNITED STATES PATENT AND TRADEMARK OFFICE
CERTIFICATE OF CORRECTION

PATENT NO.    : 6,141,514
DATED         : October 31, 2000
INVENTOR(S)   : Ryohei Inaba, et al.

It is certified that error appears in the above-identified patent and that said Letters Patent is hereby corrected as shown below:

Title page,
Item [30] FOREIGN APPLICATION PRIORITY DATA:

"November 20, 1998" should read -- November 10, 1998 --.

Column 2,
Line 36, "Mscrew-" should read -- screw --.

Column 11,
Line 61, "idh" should be deleted.

Column 18,
Line 55, "Ering" should read -- E-ring --.

Column 19,
Line 63, "housing." should read -- housing --.

Signed and Sealed this

Sixteenth Day of October, 2001

Attest:

NICHOLAS P. GODICI
Attesting Officer      Acting Director of the United States Patent and Trademark Office